(12) United States Patent
Tanida et al.

(10) Patent No.: US 9,719,873 B2
(45) Date of Patent: Aug. 1, 2017

(54) PRESSURE SENSOR AND METHOD FOR MANUFACTURING THE SAME

(71) Applicant: DENSO CORPORATION, Kariya, Aichi-pref. (JP)

(72) Inventors: Katsunori Tanida, Kariya (JP); Takeshi Murata, Kariya (JP); Naoki Fujimoto, Anjo (JP); Masao Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 193 days.

(21) Appl. No.: 14/764,197

(22) PCT Filed: Feb. 21, 2014

(86) PCT No.: PCT/JP2014/000900
§ 371 (c)(1),
(2) Date: Jul. 29, 2015

(87) PCT Pub. No.: WO2014/132601
PCT Pub. Date: Sep. 4, 2014

(65) Prior Publication Data
US 2015/0362392 A1   Dec. 17, 2015

(30) Foreign Application Priority Data

Feb. 26, 2013 (JP) .................................. 2013-35878
Dec. 4, 2013 (JP) ................................. 2013-251179
(Continued)

(51) Int. Cl.
*G01L 9/00* (2006.01)
*G01L 23/28* (2006.01)

(52) U.S. Cl.
CPC ............ *G01L 9/0051* (2013.01); *G01L 23/28* (2013.01); *Y10T 29/49131* (2015.01)

(58) Field of Classification Search
CPC .. G01L 9/0051; G01L 23/28; Y10T 29/49131
See application file for complete search history.

(56) References Cited

U.S. PATENT DOCUMENTS

| | | | |
|---|---|---|---|
| 5,859,759 A | 1/1999 | Moriyama et al. | |
| 6,442,027 B2 * | 8/2002 | Sanada | H05K 1/144 29/832 |

(Continued)

FOREIGN PATENT DOCUMENTS

| | | |
|---|---|---|
| JP | 2001-237519 A | 8/2001 |
| JP | 2002-188975 A | 7/2002 |

(Continued)

OTHER PUBLICATIONS

International Search Report of the International Searching Authority mailed Jun. 3, 2014 for the corresponding international application No. PCT/JP2014/000900 (and English translation).

(Continued)

*Primary Examiner* — David Bolduc
(74) *Attorney, Agent, or Firm* — Posz Law Group, PLC

(57) ABSTRACT

A method for manufacturing a pressure sensor includes: preparing a stem which has a cylindrical shape with a bottom as a diaphragm; mounting a sensor chip on the diaphragm; preparing a conductive member, in which an internal connection region is integrated with an external connection region electrically connected to an external circuit by an outer frame; forming a first resin mold to couple the internal connection region to the external connection region; separating the outer frame from the internal connection region and the external connection region; arranging the internal connection region in the stem; and electrically connecting the sensor chip and the internal connection region through the first connection member.

17 Claims, 19 Drawing Sheets

(30) Foreign Application Priority Data

Jan. 24, 2014 (JP) .................................. 2014-11406
Jan. 31, 2014 (JP) .................................. 2014-17919

(56) References Cited

U.S. PATENT DOCUMENTS

| | | | |
|---|---|---|---|
| 6,997,058 B2* | 2/2006 | Toyoda | G01L 9/0055 73/726 |
| 2002/0100331 A1 | 8/2002 | Imai et al. | |
| 2004/0231426 A1 | 11/2004 | Fujimoto et al. | |
| 2006/0156825 A1* | 7/2006 | Toyoda | G01L 9/0064 73/723 |
| 2008/0098819 A1* | 5/2008 | Murata | G01L 19/0627 73/708 |
| 2009/0049921 A1* | 2/2009 | Otsuka | G01L 19/0069 73/706 |
| 2011/0290029 A1 | 12/2011 | Willner et al. | |
| 2011/0290030 A1 | 12/2011 | Willner et al. | |
| 2011/0290539 A1 | 12/2011 | Willner et al. | |

FOREIGN PATENT DOCUMENTS

| | | |
|---|---|---|
| JP | 2003-270069 A | 9/2003 |
| JP | 2005-257505 A | 9/2005 |
| JP | 2009-152329 A | 7/2009 |
| JP | 2010-032239 A | 2/2010 |
| JP | 2012-107881 A | 6/2012 |

OTHER PUBLICATIONS

Written Opinion of the International Searching Authority mailed Jun. 3, 2014 for the corresponding international application No. PCT/JP2014/000900 (and English translation).

Office Action mailed Nov. 4, 2015 issued in corresponding JP patent application No. 2014-017919 (and English translation).

* cited by examiner

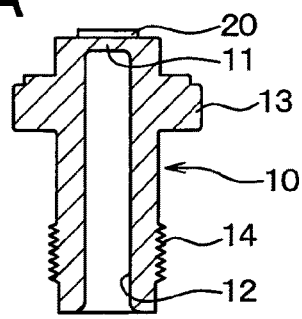
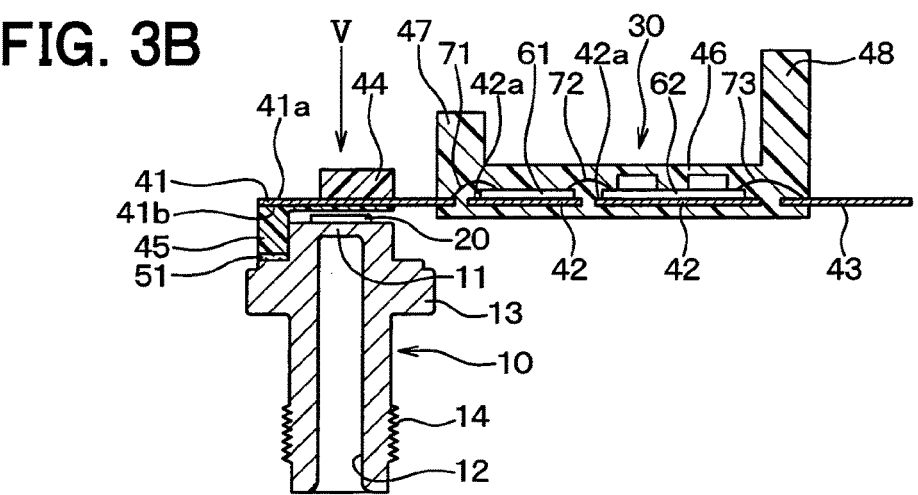
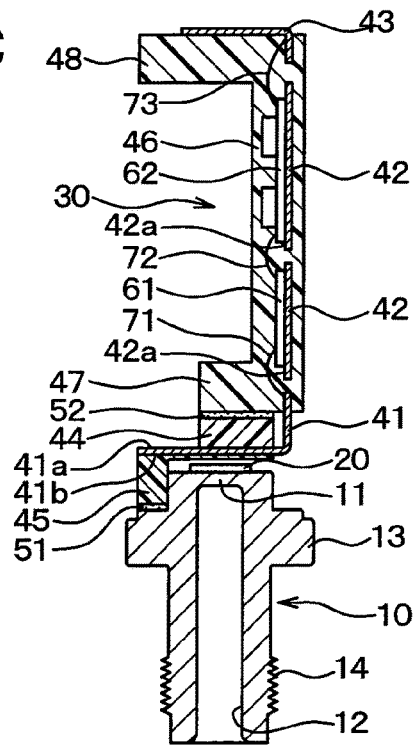

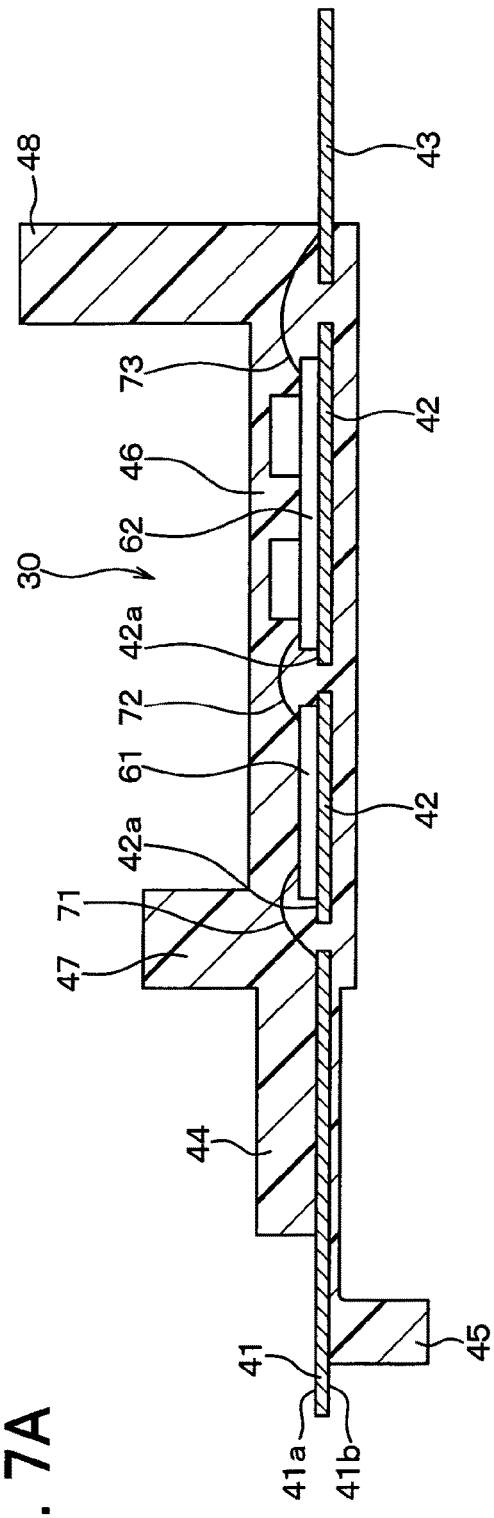
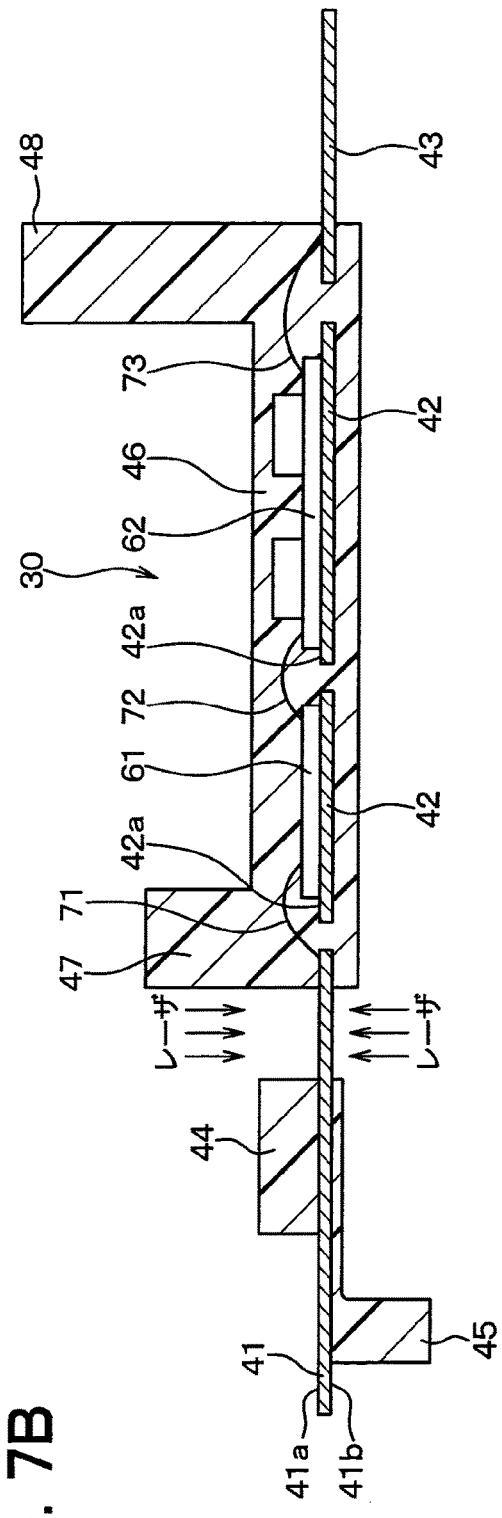
FIG. 7A
FIG. 7B

PRESSURE SENSOR AND METHOD FOR MANUFACTURING THE SAME

CROSS REFERENCE TO RELATED APPLICATIONS

This application is a U.S. national stage of International Application No. PCT/JP2014/000900 filed on Feb. 21, 2014 and is based on Japanese Patent Application No. 2013-35878 filed on Feb. 26, 2013, Japanese Patent Application No. 2013-251179 filed on Dec. 4, 2013, Japanese Patent Application No. 2014-011406 filed on Jan. 24, 2014 and Japanese Patent Application No. 2014-017919 filed on Jan. 31, 2014, the disclosures of which are incorporated herein by reference.

TECHNICAL FIELD

The present disclosure relates to a pressure sensor in which a sensor chip is disposed in a diaphragm of a stem, and a method for manufacturing the same.

BACKGROUND ART

Up to now, as the pressure sensor of this type, for example, Patent Literature 1 has proposed the following pressure sensor.

That is, in the pressure sensor, a sensor chip is mounted on a diaphragm of a stem, and the sensor chip is electrically connected to a ceramic substrate through a bonding wire. The ceramic substrate is disposed around the stem, and performs a predetermined process. The ceramic substrate is connected to a terminal electrically connected to an external circuit through a pin.

However, in the above pressure sensor, different components such as the pin and the terminal are used for only ensuring an electric path between the sensor chip and the external circuit, resulting in such problems that the structure is complicated, and the manufacturing process is also complicated.

PRIOR ART LITERATURES

Patent Literature

Patent Literature 1: JP-2010-32239 A

SUMMARY OF INVENTION

It is an object of the present disclosure to provide a pressure sensor and a method for manufacturing the pressure sensor, which are capable of simplifying a structure and a manufacturing process with a reduction in components for ensuring an electric path between a sensor chip and an external circuit.

According to a first aspect of the present disclosure, a method for manufacturing a pressure sensor includes: preparing a stem which has a cylindrical shape with a bottom having a hollow portion with an opening on one end of the stem, the bottom as a diaphragm being deformable by a pressure introduced into the hollow portion; mounting a sensor chip, which outputs a sensor signal according to a deformation of the diaphragm, on a side of the diaphragm opposite to the hollow portion; preparing a conductive member, in which an internal connection region connected to the sensor chip through a first connection member is integrated with an external connection region electrically connected to an external circuit by an outer frame; forming a first resin mold by molding with mold resin to couple the internal connection region to the external connection region; separating the outer frame from the internal connection region and the external connection region; arranging the internal connection region of the conductive member in the stem; and electrically connecting the sensor chip and the internal connection region through the first connection member.

According to the above manufacturing method, the pressure sensor is formed of the conductive member in which the internal connection region and the external connection region are integrated together. In other words, the internal connection region and the external connection region are made of the same material. For that reason, components for ensuring the electric path between the sensor chip and the external circuit can be reduced, and the manufacturing process can be simplified.

Alternatively, the conductive member may have a mounting region between the internal connection region and the external connection region. The method for manufacturing the pressure sensor further includes: mounting a circuit element for performing a predetermined process on the mounting region before the arranging of the internal connection region; electrically connecting the circuit element and the internal connection region through a second connection member; and electrically connecting the circuit element and the external connection region through a third connection member. In the forming of the first resin mold, the first resin mold seals the mounting region, the circuit element, the second connection member, and the third connection member. In that case, the mounting region in which the circuit element is mounted is also formed of the conductive member making the internal connection region and the external connection region, and there is no increase in a new component for mounting the circuit element.

According to a second aspect of the present disclosure, a pressure sensor includes: a stem that has a cylindrical shape with a bottom having a hollow portion with an opening on one end of the stem, the bottom as a diaphragm being deformable by a pressure introduced into the hollow portion; a sensor chip that is mounted on a side of the diaphragm opposite to the hollow portion, and outputs a sensor signal according to a deformation of the diaphragm; an internal connection region connected to the sensor chip through a first connection member and providing a part of a conductive member; an external connection region electrically connected to an external circuit and providing another part of the conductive member; a first resin mold that couples the internal connection region and the external connection region; and a second resin mold arranged in the internal connection region and bonded to the stem.

According to the above pressure sensor, because the internal connection region and the external connection region are formed of the same conductive member, the components for ensuring the electric path between the sensor chip and the external circuit can be reduced, and the structure can be simplified.

BRIEF DESCRIPTION OF DRAWINGS

The above and other objects, features and advantages of the present disclosure will become more apparent from the following detailed description made with reference to the accompanying drawings. In the drawings:

FIGS. 3A to 3C are cross-sectional views illustrating a process of manufacturing a pressure sensor illustrated in FIG. 1;

FIG. 7A is a cross-sectional view taken along a line VIIA-VIIA in FIG. 6A, and FIG. 7B is a cross-sectional view taken along a line VIIB-VIIB in FIG. 6B;

EMBODIMENTS FOR CARRYING OUT INVENTION

Embodiments of the present disclosure will be described below with reference to the drawings. In the following respective embodiments, parts identical with or equivalent to each other are denoted by the same symbols for description.

First Embodiment

A first embodiment of the present disclosure will be described with reference to the drawings. A pressure sensor according to this embodiment is preferably attached to, for example, a fuel pipe in a fuel injection system for a vehicle, and used for detection of a pressure of a measurement medium within the fuel pipe.

Figure 1:
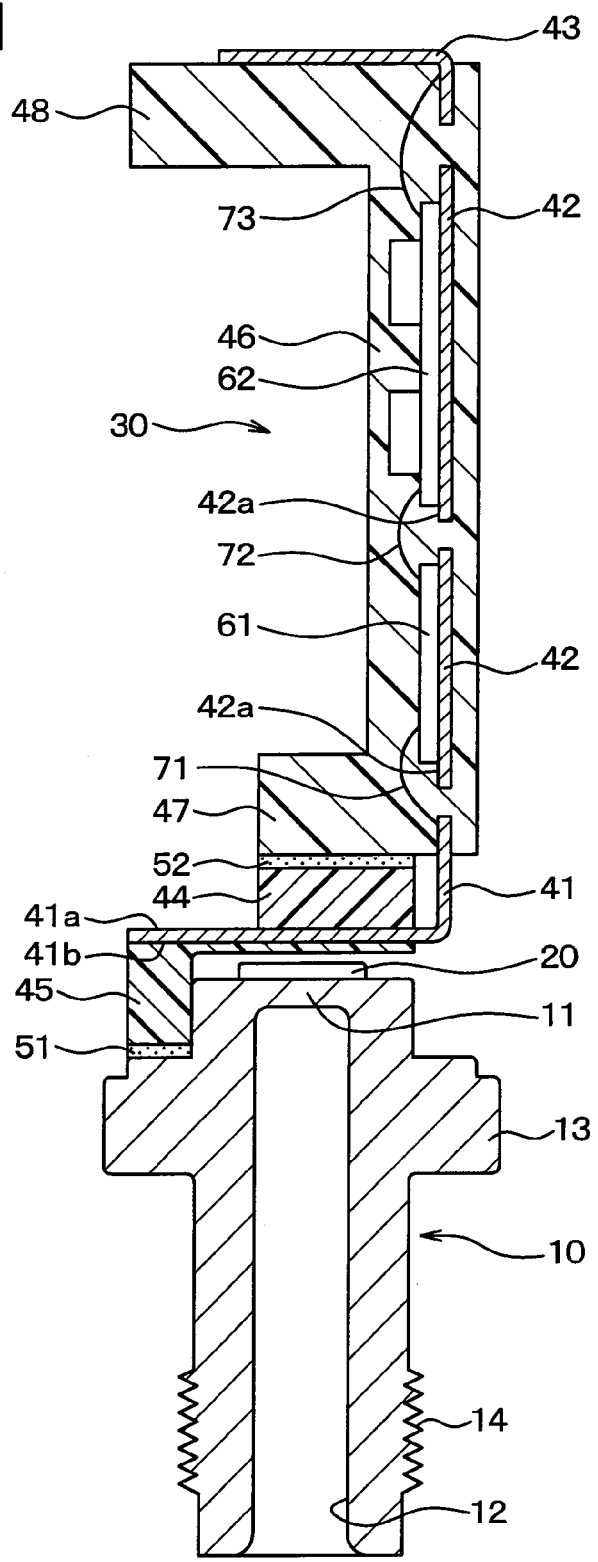
FIG. 1 is a cross-sectional view of a pressure sensor according to a first embodiment of the present disclosure.

As illustrated in FIG. 1, a pressure sensor according to this embodiment includes a stem 10. The stem 10 is formed into a bottomed cylindrical shape having a hollow portion made of stainless steel such as SUS 430, and a thin diaphragm 11 is formed by a substantially central portion of a bottom portion. A hollow opening 12 is provided on the other end opposite to the diaphragm 11. When the measurement medium is introduced into the hollow portion from the opening 12, the diaphragm 11 is deformed according to a pressure of the measurement medium.

A step portion 13 is formed between the diaphragm 11 and the opening 12 in the stem 10. An outer diameter of the step portion 13 is set to be larger than outer diameters of both ends of the stem 10. A threaded portion 14 is defined in an outer peripheral wall surface of the opening 12 side. The threaded portion 14 can be screwed into a mounting member such as a fuel pipe.

A sensor chip 20 for pressure detection is joined to the above stem 10 on an opposite side (hereinafter referred to as "on the diaphragm 11") of the diaphragm 11 to the hollow portion side through a low-melting point glass not shown. The sensor chip 20 is formed of a rectangular plate-like silicon substrate, and gauge resistors configuring a bridge circuit are formed on the thin diaphragm. In other words, the sensor chip 20 according to this embodiment is of a semiconductor diaphragm type in which when the diaphragm 11 is deformed by the pressure of the measurement medium introduced into an interior of the stem 10, a voltage across the bridge circuit changes with a change in resistance values of the gauge resistors, and a sensor signal corresponding to the change in the voltage is output.

A component 30 is disposed over the stem 10. In the component 30, circuit elements are sealed along a normal direction of the diaphragm 11 (vertical direction of a power surface in FIG. 1). Hereinafter, a configuration of the component 30 according to this embodiment will be described in detail.

The component 30 includes an internal connection region 41, a mounting region 42, and an external connection region 43. The respective regions 41 to 43 are integrated with mold resin such as epoxy resin into one member. The internal connection region 41, the mounting region 42, and the external connection region 43 are provided by parts of lead frames in which metal such as Cu or 42 alloy is etched or pressed which will be described later. In other words, the internal connection region 41, the mounting region 42, and the external connection region 43 are different in shape from each other, but formed of the same component.

The internal connection region 41 includes multiple plate members (four in this embodiment), and is disposed over the diaphragm 11. One surface 41a on one end side of the respective plate members is electrically connected to the sensor chip 20 through a bonding wire not shown, and the other end side of the respective plate members is bent in parallel to the normal direction of the diaphragm 11.

A resin mold is formed in the internal connection region 41 so that a part of the internal connection region 41 is exposed. Specifically, a mounting portion 44 made of mold resin is formed on the one surface 41a side so that one end and the other end of the internal connection region 41 are exposed from the mounting portion 44. Portions of the internal connection region 41, which are connected to the bonding wires, are also exposed from the mounting portion 44.

A joint portion 45 made of mold resin is formed on the other surface 41b side so that the other end is exposed from the joint portion 45. The joint portion 45 is shaped to have a wall surface along an outer peripheral wall surface of the stem 10 on the diaphragm 11 side, and a tip surface of the joint portion 45 on the opposite side to the other surface 41b of the internal connection region 41 is joined to the step portion 13 through an adhesive 51.

In this embodiment, the joint portion 45 is connected to the stem 10, and the internal connection region 41 comes out of contact with the diaphragm 11. In this embodiment, the mounting portion 44 and the joint portion 45 correspond to a second resin mold of the present disclosure.

The mounting region 42 has two rectangular plate members, and is disposed so that one surface 42a is in parallel to the normal direction of the diaphragm 11. A circuit substrate 61 that performs a predetermined process and a ceramic substrate 62 on which a capacitor is disposed are mounted on the one surface 42a. The circuit substrate 61 is electrically connected to the other end of the internal connection region 41 through bonding wires 71, and also electrically connected to the ceramic substrate 62 through bonding wires 72. The ceramic substrate 62 is electrically connected to the external connection region 43 through bonding wires 73.

The mounting region 42 is sealed with a sealing portion 46 together with portions (the other end) of the internal connection region 41 which are connected to the bonding wires 71, portions of the external connection region 43 which are connected to the bonding wires 73, and the bonding wires 71 to 73. In other words, the internal connection region 41, the mounting region 42, and the external connection region 43 are coupled with each other by the sealing portion 46.

The sealing portion 46 according to this embodiment is formed into a substantially U-shape having a first protruding portion 47 and a second protruding portion 48 projecting in a normal direction of the one surface 42a of the mounting region 42 on both ends of the sealing portion 46 in the normal direction of the diaphragm 11.

The sealing portion 46 is fixed to the mounting portion 44 by joining an outer side surface of the first protruding portion 47 to the mounting portion 44 through an adhesive 52 in a state where the first protruding portion 47 is stacked over the mounting portion 44.

The external connection region 43 is formed of multiple rod-like members (two in this embodiment), and one end of the external connection region 43, which is connected to the bonding wire 73, is sealed with the sealing portion 46 as described above. The other end side of the external connection region 43 is bent so as to come into contact with an outer side surface of the second protruding portion 48 in the sealing portion 46, and a bent portion of the external connection region 43 performs a connection with an external circuit.

In this embodiment, the sealing portion 46, and the first and second protruding portions 47, 48 correspond to a first resin mold of the present disclosure. The circuit substrate 61 and the ceramic substrate 62 correspond to a circuit element of the present disclosure. The bonding wires 71 correspond to a second connection member of the present disclosure, and the bonding wires 73 correspond to a third connection member of the present disclosure.

The pressure sensor according to this embodiment is configured as described. Subsequently, a method for manufacturing the pressure sensor will be described with reference to FIGS. 2A to 5. First, a process of manufacturing the component 30 will be described.

Figure 2A:
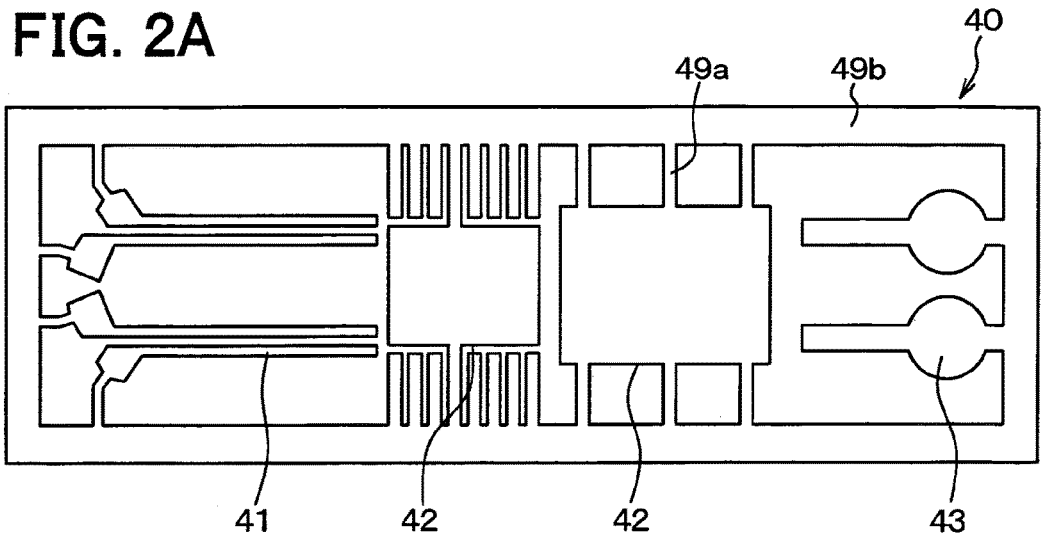
FIGS. 2A to 2C are cross-sectional views illustrating a process of manufacturing components.

As illustrated in FIG. 2A, a lead frame 40 in which the internal connection region 41, the mounting region 42, and the external connection region 43 are arranged in order, and integrated together by the aid of an outer frame 49b through tie bars 49a is prepared. In that state, the internal connection region 41, the mounting region 42, and the external connection region 43 are merely integrated together by the outer frame 49b, and not coupled directly with each other.

Figure 2B:
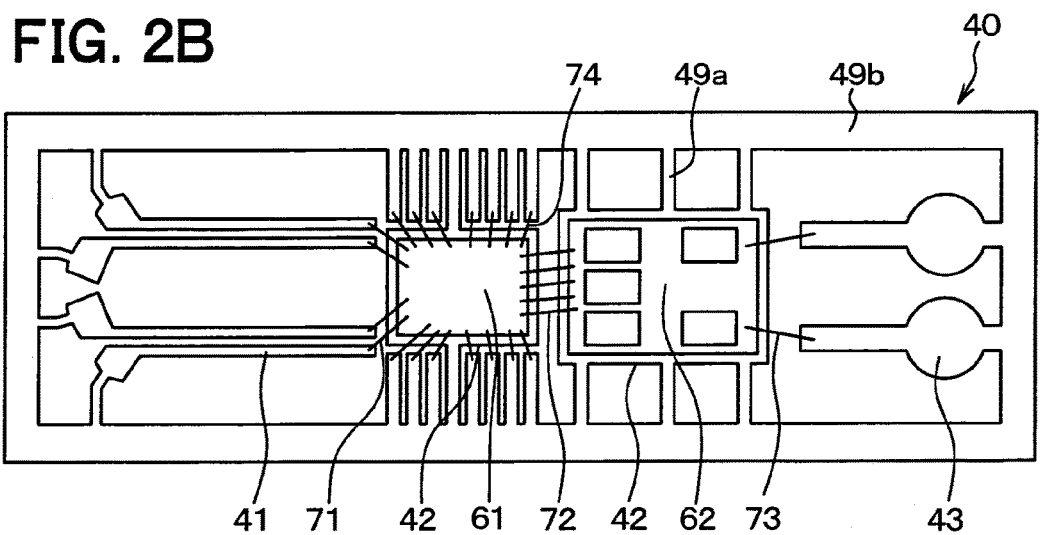

As illustrated in FIG. 2B, the circuit substrate 61 and the ceramic substrate 62 are mounted in the mounting region 42 through an adhesive not shown. Then, the circuit substrate 61 is electrically connected to the other end of the internal connection region 41 through the bonding wires 71. Likewise, the circuit substrate 61 is electrically connected to the ceramic substrate 62 through the bonding wires 72. The ceramic substrate 62 is electrically connected to one end of the external connection region 43 through the bonding wires 73.

In this embodiment, for the purpose of performing the characteristic inspection of the circuit substrate 61, the circuit substrate 61 is electrically connected to the tie bars 49a disposed around the mounting region 42 through bonding wires 74.

Figure 2C:
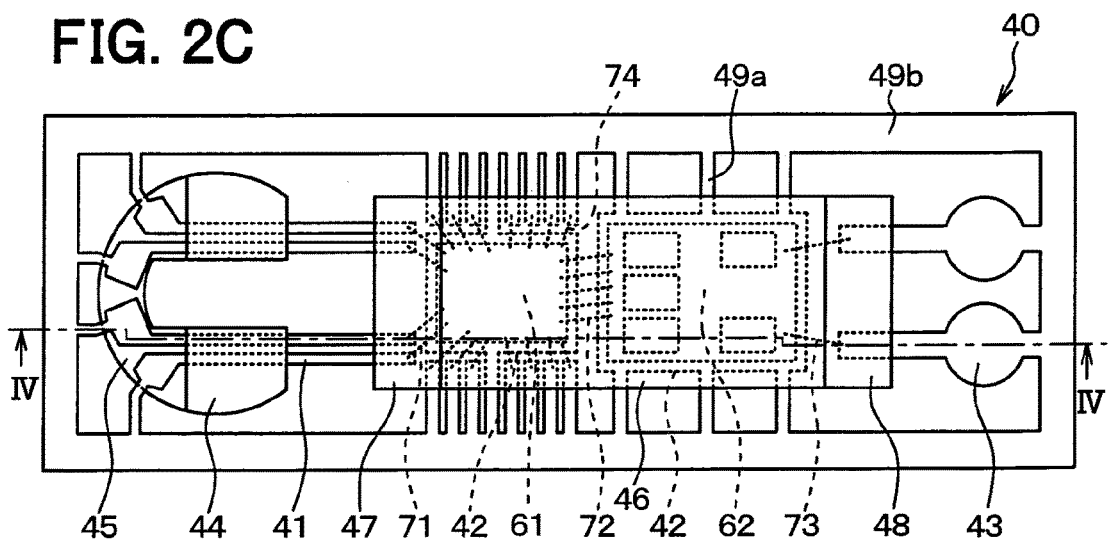
Figure 4:
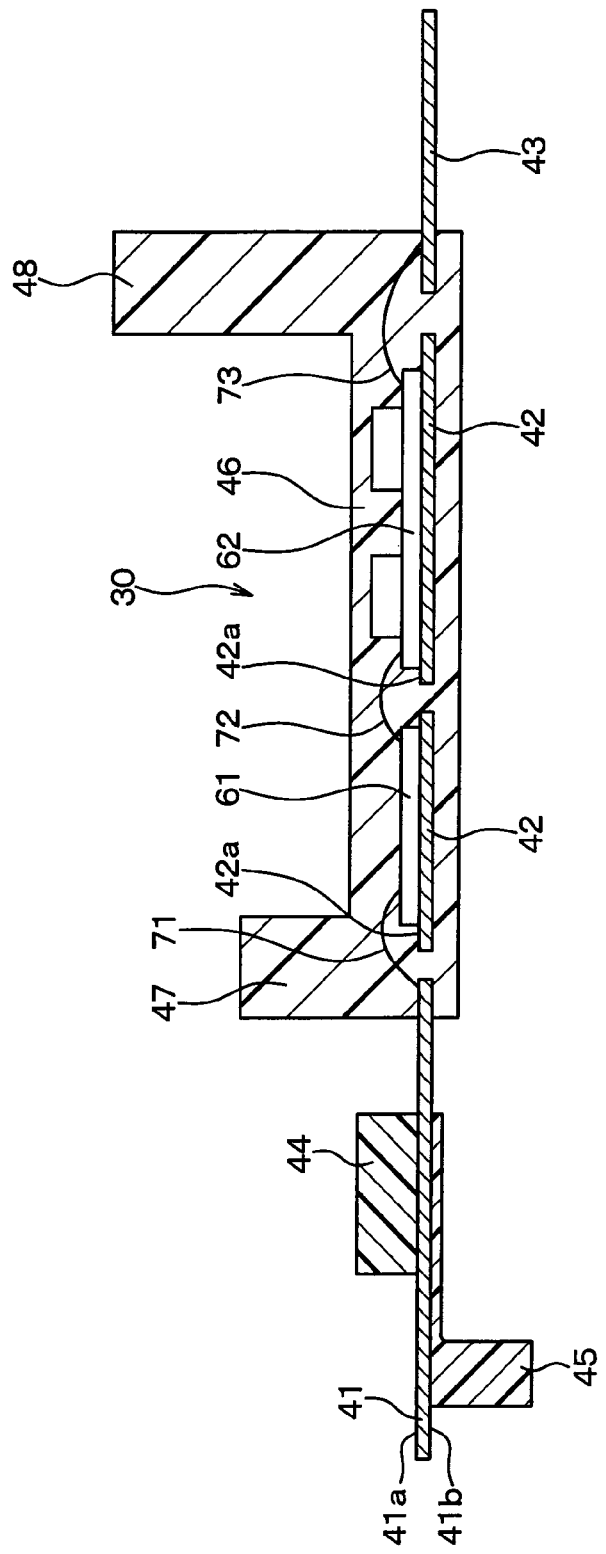
FIG. 4 is a cross-sectional view taken along a line IV-IV in FIG. 2C.

Then, as illustrated in FIGS. 2C and 4, the lead frame 40 is placed in a mold not shown, and a mold resin is injected into the mold to form the mounting portion 44, the joint portion 45, the sealing portion 46, and the first and second protruding portions 47, 48 shaped as described above. Thereafter, although not particularly shown, after the tie bars 49a and the outer frame 49b are separated from each other, the characteristic inspection of the circuit substrate 61 is performed. Even after the outer frame 49b is separated from the tie bars 49a, the internal connection region 41, the mounting region 42, and the external connection region 43 are coupled with each other, and integrated together by the sealing portion 46. The component 30 is prepared as described above.

In another process different from the processes of FIGS. 2A to 2C, as illustrated in FIG. 3A, the sensor chip 20 is mounted over the diaphragm 11 of the stem 10 through a low-melting point glass.

Then, as illustrated in FIG. 3B, the joint portion 45 is joined to the step portion 13 of the stem 10 through the adhesive 51 to dispose the component 30 over the stem 10. After that process, the component 30 becomes in a state to extend in a planar direction of the diaphragm 11.

Figure 5:
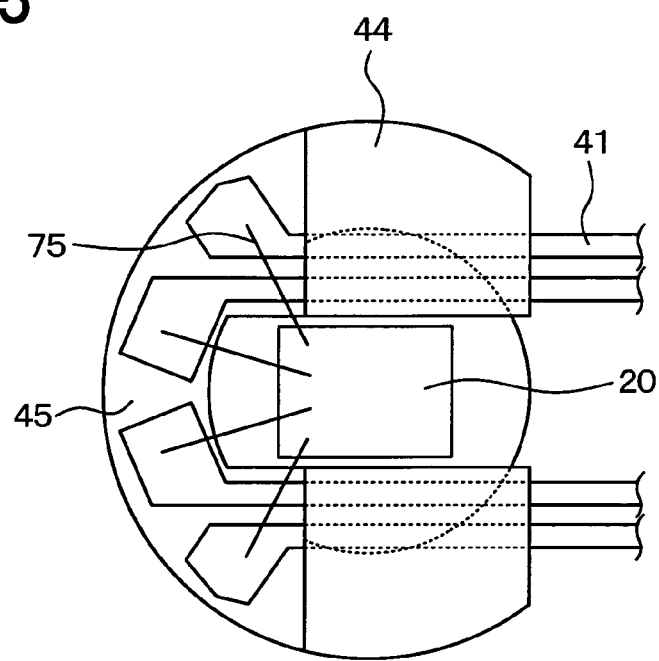
FIG. 5 is a view taken in an arrow V in FIG. 3B.

Further, as illustrated in FIG. 5, the sensor chip 20 is electrically connected to a portion of one surface 41a of the internal connection region 41 on one end side exposed from the mounting portion 44 through bonding wires 75. With the above configuration, the sensor chip 20 is electrically connected to the external circuit through the bonding wires 75, the internal connection region 41, the bonding wires 72, the circuit substrate 61, the bonding wires 73, the ceramic substrate 62, the bonding wires 73, and the external connection region 43.

In this embodiment, the bonding wires 75 correspond to a first connection member of the present disclosure.

Then, as illustrated in FIG. 3C, a portion of the internal connection region 41 which is located between the mounting portion 44 (joint portion 45) and the sealing portion 46 is bent so that the one surface 42a of the mounting region 42 becomes in parallel to the normal direction of the diaphragm 11. Further, the first protruding portion 47 is joined to the mounting portion 44 through the adhesive 52 while the side surface of the first protruding portion 47 in the sealing portion 46 is stacked over the mounting portion 44.

Thereafter, a portion of the external connection region 43, which is exposed from the sealing portion 46, is so bent as to come into contact with the outer side surface of the second protruding portion 48, thereby manufacturing the pressure sensor illustrated in FIG. 1.

The process of bending the external connection region 43 may be performed at any time after the tie bars 49a are separated from the outer frame 49b. The process of separating the tie bars 49a from the outer frame 49b may be performed after the component 30 is disposed over the stem 10.

As described above, the electric connection of the sensor chip 20 with the external circuit is performed through the internal connection region 41 and the external connection region 43 configured by a part of the lead frame 40. For that reason, the component for electrically connecting the sensor chip 20 to the external circuit can be reduced, and further a reduction in the costs can be performed.

In this embodiment, the lead frame 40 having the internal connection region 41, the mounting region 42, and the external connection region 43 is prepared, and the electric connections between the circuit substrate 61 and the ceramic substrate 62 and between the internal connection region 41 and the external connection region 43 are performed in a state of the lead frame 40. For that reason, after the component 30 is disposed over the stem 10, only the process of electrically connecting the sensor chip 20 to the internal connection region 41 through the bonding wires 75, and the bending process may be performed. That is, there is no need to perform the complicated assembling process after the component 30 is disposed over the stem 10, and the manufacturing process can be simplified.

Second Embodiment

A second embodiment of the present disclosure will be described. In the above first embodiment, the example in which the mold resin is injected into the mold to form the mounting portion 44, the joint portion 45, the sealing portion 46, and the first and second protruding portions 47, 48 in the process of FIG. 2C is described. However, when the mold resin is injected into the mold to form the respective members 44 to 48 as they are, a shape of the mold is easy to be complicated, and further the manufacturing process is easy to be complicated.

In other words, the respective members 44 to 48 are formed by injecting the mold resin into a cavity (space) defined in the mold. The mounting portion 44 and the joint portion 45 are spaced from each other, and the sealing portion 46 and the first and second protruding portions 47, 48 are spaced from each other. The sizes of the respective members (required resin amount) are different from each other. For that reason, as the mold, a shape of a pod serving as a reservoir source of the mold resin, a shape of a gate serving as an injection port into the cavity, and a shape of a runner connecting the pod to the gate must be appropriately regulated, the shape of the mold is easy to be complicated, and further the manufacturing process is easy to be complicated.

Therefore, in this embodiment, the shape of the mold can be restrained from becoming complicated as compared with the first embodiment. The other configurations are identical with those in the first embodiment, and their description will be omitted.

Figure 6A:
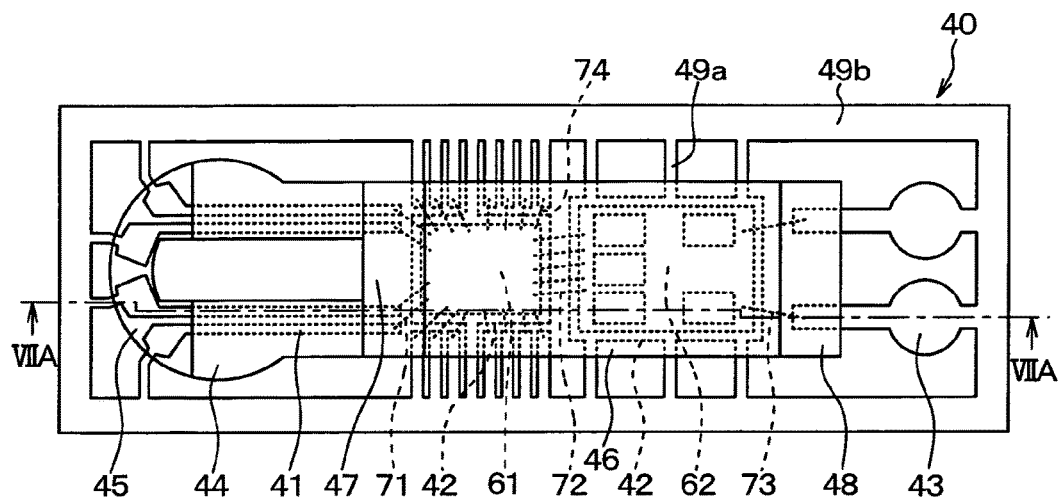
FIGS. 6A to 6B are top views illustrating a process of manufacturing a pressure sensor according to a second embodiment of the present disclosure.

In this embodiment, as illustrated in FIGS. 6A and 7A, in performing the process of FIG. 2C, a resin mold is formed so that a mounting portion 44 and a joint portion 45 are integrated together, and a sealing portion 46 and first and second protruding portions 47, 48 are integrated together.

Figure 6B:
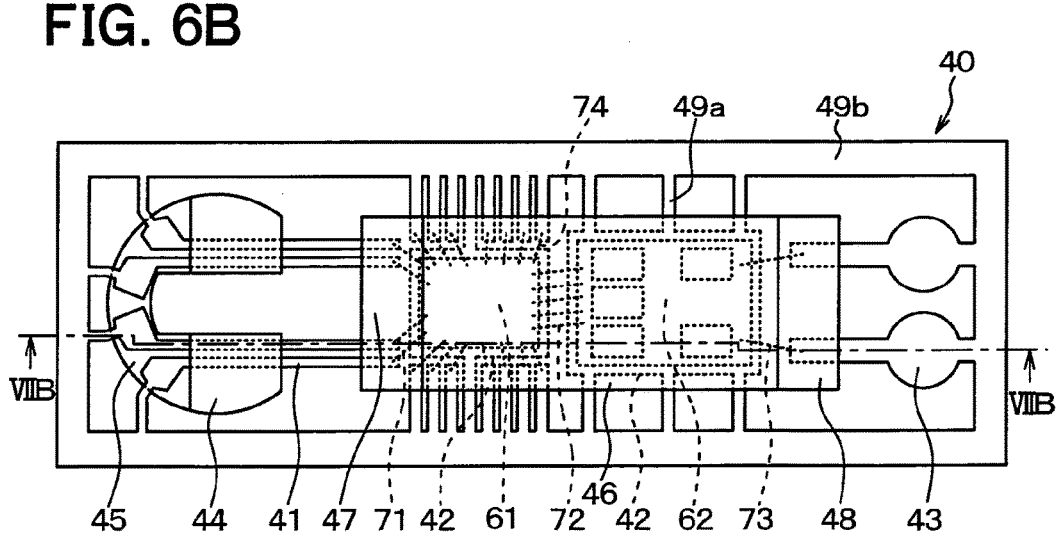

Further, as illustrated in FIGS. 6B and 7B, the resin molds of the respective portions of coupling the mounting portion 44 with the joint portion 45 and the sealing portion 46 with the first and second protruding portions 47, 48 are irradiated with laser, and removed. With that process, the portion of the internal connection region 41 which is located between the mounting portion 44 (joint portion 45) and the sealing portion 46, is exposed. The mounting portion 44 and the joint portion 45 are divided from each other, and the sealing portion 46 and the first and second protruding portions 47, 48 are divided from each other.

FIG. 7A is a cross-sectional view corresponding to a line VIIA-VIIA in FIG. 6A, and FIG. 7B is a cross-sectional view corresponding to a line VIIB-VIIB in FIG. 6B.

According to the above process, in forming the respective members 44 to 48 with the use of the mold, the resin mold is formed so that the mounting portion 44 and the joint portion 45 are integrated together, and the sealing portion 46 and the first and second protruding portions 47, 48 are integrated together. In other words, one molded product is formed for a lead frame 40. For that reason, the shape of the mold can be restrained from becoming complicated, and further the manufacturing process can be simplified.

The method of irradiating the resin molds that couple those portions together with laser for removal in order to separate the mounting portion 44 from the joint portion 45, and the sealing portion 46 from the first and second protruding portions 47 and 48 is described above. However, the method of removing the resin molds of the portions that couple the mounting portion 44 with the joint portion 45, and the sealing portion 46 with the first and second protruding portions 47 and 48 is not limited to the above method. For example, in this embodiment, because the resin mold is made of an epoxy resin, the resin mold may be removed by etching using fuming nitric acid after a mask is appropriately formed.

Third Embodiment

A third embodiment of the present disclosure will be described. In this embodiment, an internal connection region 41 is disposed directly on a stem 10 as compared with the first embodiment. The other configurations are identical with those in the first embodiment, and therefore their description will be omitted.

Figure 8A:
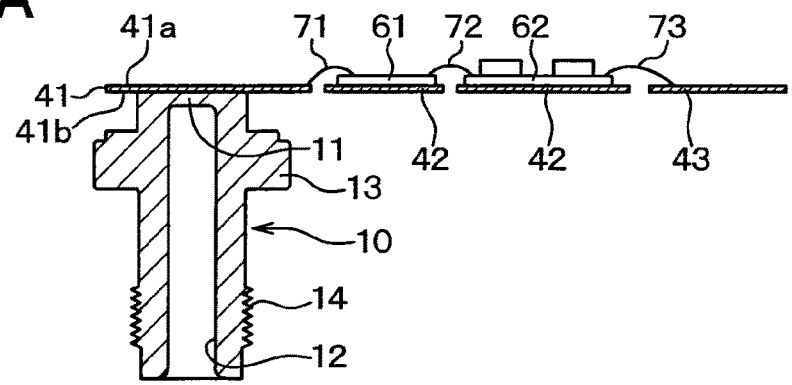
FIGS. 8A to 8C are cross-sectional views illustrating a process of manufacturing a pressure sensor according to a third embodiment of the present disclosure.

As illustrated in FIG. 8A, in this embodiment, after a sensor chip 20 is mounted on a diaphragm 11 of the stem 10, a lead frame 40 is disposed directly on the stem 10. Specifically, the other surface 41b of the internal connection region 41 is joined to a periphery of a portion of the stem 10 in which the sensor chip 20 is disposed through an adhesive to dispose the lead frame 40 directly on the stem 10.

Figure 8B:
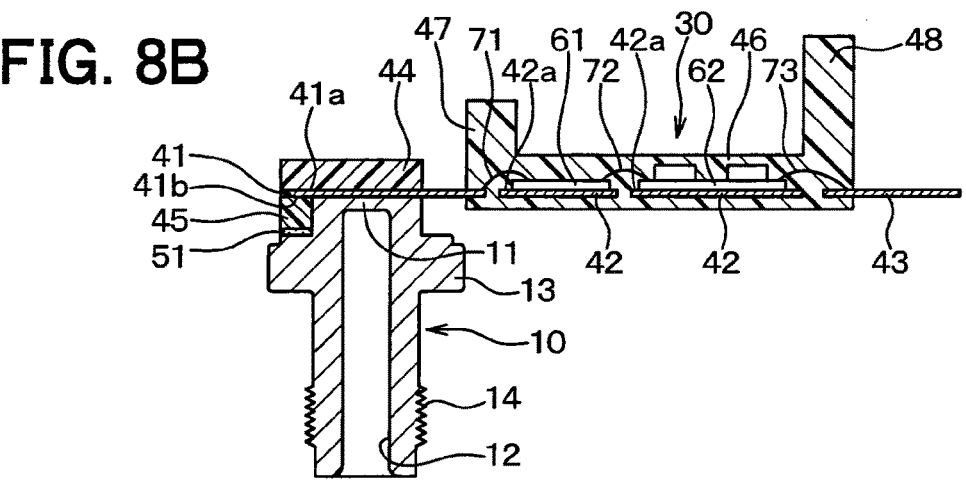
Figure 8C:
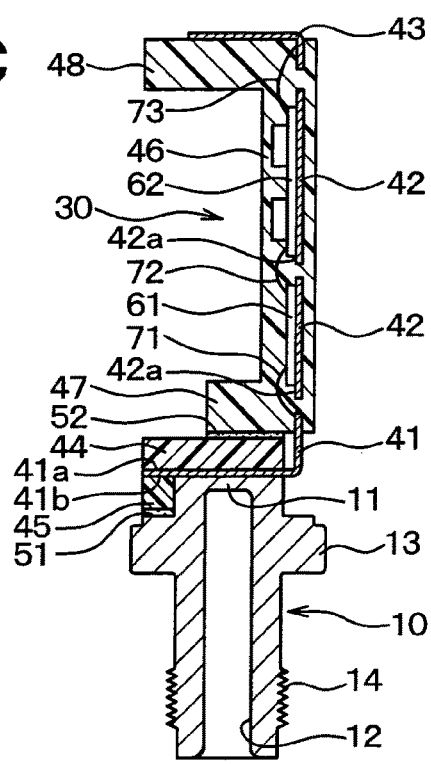

FIGS. 8A to 8C illustrate cross-sections taken along the lead frame 40, and FIGS. 3A to 3C are different cross-sections in which the sensor chip 20 is disposed on the stem 10. The internal connection region 41, a mounting region 42, and an external connection region 43 are integrated together by an outer frame 49b through tie bars 49a in a different cross-section from FIG. 8A.

Thereafter, as in FIG. 5 described above, the sensor chip 20 is electrically connected to one surface 41a of the internal connection region 41 through bonding wires 75.

Then, as illustrated in FIG. 8B, the stem 10 to which the lead frame 40 is joined is placed in a mold not shown, and a mold resin is injected into the mold to form a mounting portion 44, a joint portion 45, a sealing portion 46, and first and second protruding portions 47, 48. In that situation, the mounting portion 44 is formed to cover the sensor chip 20, portions of the internal connection region 41 which are connected to the bonding wires 75, and the bonding wires 75.

Thereafter, as illustrated in FIG. 8C, as in the above process of FIG. 3C, the mounting portion 44 is joined to the first protruding portion 47 to manufacture the pressure sensor.

Even if the mounting portion 44, the joint portion 45, the sealing portion 46, and the first and second protruding portions 47, 48 are formed after the lead frame 40 is disposed on the stem 10 as described above, the same advantages as those in the first embodiment can be obtained. In this embodiment, the mounting portion 44, the joint portion 45, the sealing portion 46, and the first and second protruding portions 47, 48 are formed after the sensor chip 20 is electrically connected to one surface 41a of the internal connection region 41 through the bonding wires 75. For that reason, the sensor chip 20, the portions of the internal connection region 41 which are connected to the bonding wires 75, and the bonding wires 75 can be also sealed, and an environment resistance can be improved.

Fourth Embodiment

A fourth embodiment of the present disclosure will be described. In this embodiment, a concave portion and a convex portion are respectively formed in the mounting portion 44 and the first protruding portion 47 in the first embodiment. The other configurations are identical with those in the first embodiment, and therefore their description will be omitted.

Figure 9A:
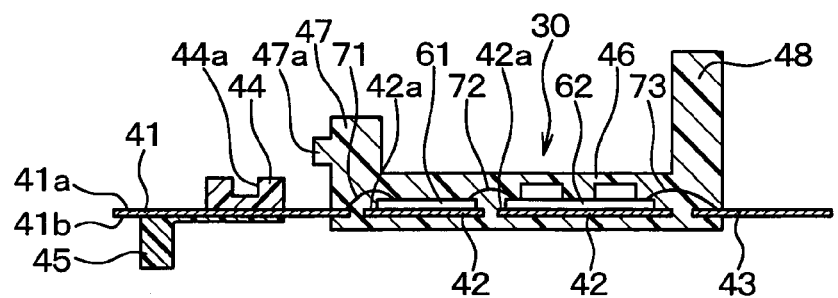
FIG. 9A is a cross-sectional view illustrating a process of manufacturing a pressure sensor according to a fourth embodiment of the present disclosure corresponding to the process of FIG. 2C.
Figure 9B:
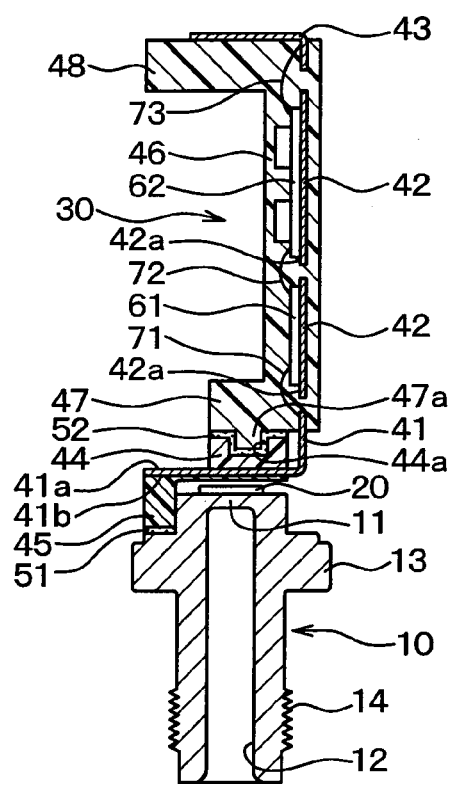
FIG. 9B is a cross-sectional view corresponding to the process of FIG. 3C.

As illustrated in FIG. 9A, in this embodiment, in performing the process of FIG. 2C, the mounting portion 44 having a concave portion 44a is formed, and the first protruding portion 47 having a convex portion 47a on a side surface is formed. As illustrated in FIG. 9B, in performing the process of FIG. 3C, the mounting portion 44 is joined to the first protruding portion 47 through an adhesive 52 while the convex portion 47a is fitted to the concave portion 44a.

According to the above configuration, the same advantages as those in the above first embodiment can be obtained while a positional deviation in joining the mounting portion 44 to the first protruding portion 47 is suppressed.

In this embodiment, the concave portion 44a and the convex portion 47a correspond to a pair of fitting device of the present disclosure. In the above configuration, a so-called snap fit joint in which a claw portion is further defined in the convex portion 47a, a recess is further defined in the concave portion 44a, and the claw portion is engaged with the recess may be applied. In that case, because the mounting portion 44 and the first protruding portion 47 are fixed to each other by the snap fit joint, the adhesive 52 may be omitted.

Further, in a process of FIG. 9A, the mounting portion 44 having a convex portion may be formed, and the first protruding portion 47 having a concave portion may be formed. The concave portion and the convex portion may be formed in the mounting portion 44 or the first protruding portion 47.

Fifth Embodiment

A fifth embodiment of the present disclosure will be described. In this embodiment, the rigidity of an internal connection region 41 is partially lowered as compared with the first embodiment. The other configurations are identical with those in the first embodiment, and therefore their description will be omitted.

Figure 10:
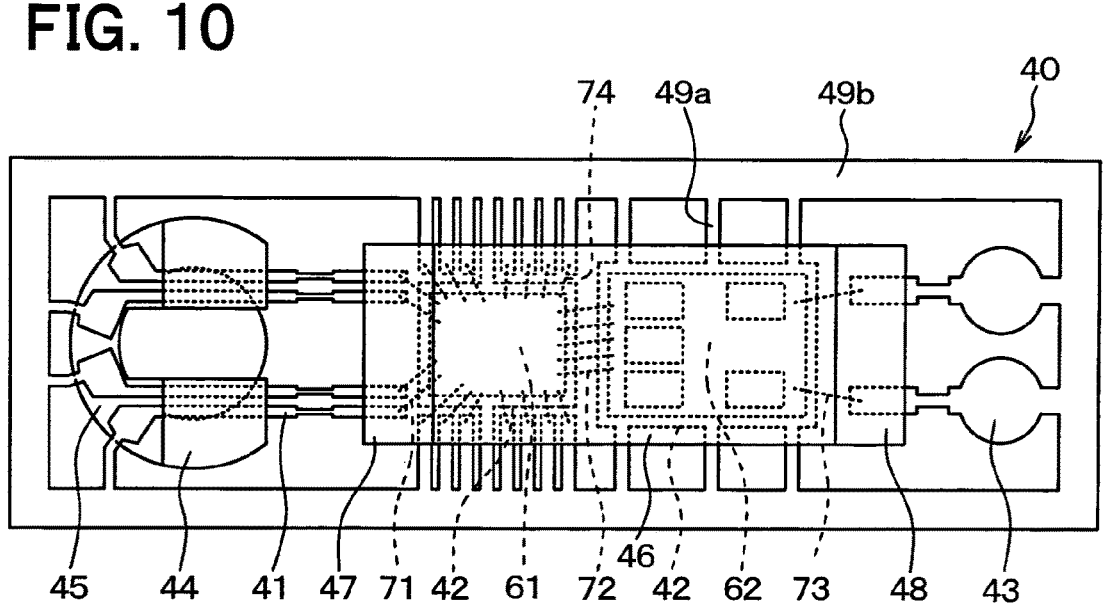
FIG. 10 is a top view corresponding to the process of FIG. 2C according to a fifth embodiment of the present disclosure.

As illustrated in FIG. 10, in this embodiment, a configuration in which a portion of an internal connection region 41 which is located between a mounting portion 44 (joint portion 45) and a sealing portion 46, and is to be bent, and a portion of an external connection region 43 which is projected (exposed) from the sealing portion 46, and is to be bent are lower in rigidity than other portions, is prepared. In this embodiment, the widths are narrowed to reduce the rigidity.

According to the above configuration, in the process of FIG. 3C, the same advantages as those in the first embodiment can be obtained while bending of the internal connection region 41 and the external connection region 43 is facilitated.

In this embodiment, the widths are narrowed to reduce the rigidity. Alternatively, the thicknesses are thinned to reduce the rigidity.

Sixth Embodiment

A sixth embodiment of the present disclosure will be described. In this embodiment, a shape of a sealing portion 46 is changed as compared with the first embodiment. The other configurations are identical with those in the first embodiment, and therefore their description will be omitted.

Figure 11A:
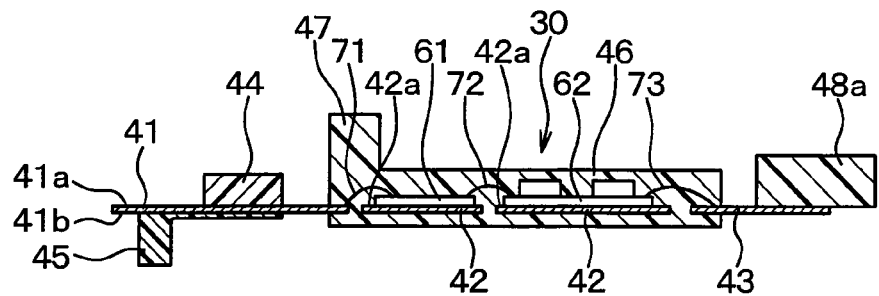
FIG. 11A is a cross-sectional view illustrating a process of manufacturing a pressure sensor according to a sixth embodiment of the present disclosure corresponding to the process of FIG. 2C.

In this embodiment, as illustrated in FIG. 11A, in performing a process of FIG. 2C, an L-shaped sealing portion 46 having only a first protruding portion 47 is formed. In other words, the sealing portion 46 having no second protruding portion 48 is formed. Further, a joint portion 48a corresponding to the second protruding portion 48 is formed on one surface of the external connection region 43.

Figure 11B:
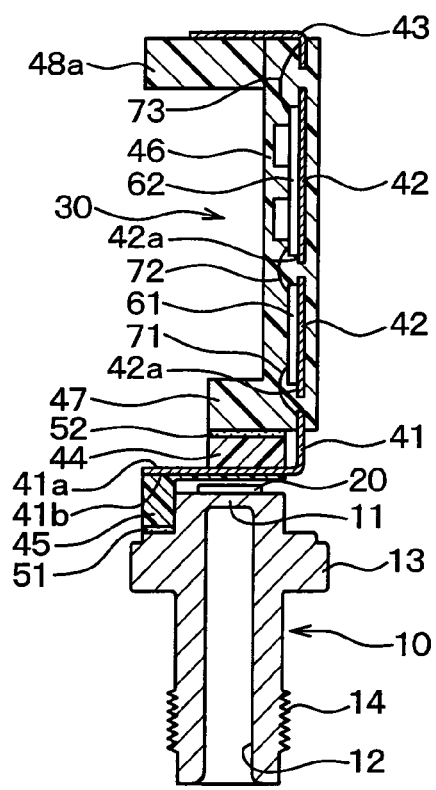
FIG. 11B is a cross-sectional view corresponding to the process of FIG. 3C.

As illustrated in FIG. 11B, an outer side surface of the joint portion 48a is joined to a surface of the sealing portion 46 through an adhesive not shown.

As described above, the same advantages as those in the first embodiment can be obtained even if the joint portion 48a is formed in the external connection region 43, and the sealing portion 46 is joined to the joint portion 48a.

Seventh Embodiment

A seventh embodiment of the present disclosure will be described. In this embodiment, gel that thermally connects the sensor chip 20 to the circuit substrate 61 is provided as compared with the first embodiment. The other configurations are identical with those in the first embodiment, and therefore their description will be omitted.

First, configurations of a sensor chip 20 and a circuit substrate 61 according to this embodiment will be described with reference to FIG. 12.

As described above and illustrated in FIG. 12, the sensor chip 20 has gauge resistors 20a to 20d configuring a bridge circuit. In this embodiment, the respective gauge resistors 20a to 20d are configured by temperature sensitive resistors each having a resistance value changed according to a temperature. The gauge resistors 20a to 20d also output a temperature detection signal corresponding to the temperature together with the sensor signal.

In this embodiment, the circuit substrate 61 includes a gauge drive resistor 61a, first and second amplifiers 61b, 61c, first and second resistors 61d, 61e, first and second filter circuits 61f, 61g, first and second AD converter circuits 61h, 61*i*, and a correction circuit 61*j*. When the circuit substrate 61 is driven, a temperature of the circuit substrate 61 rises due to self-heating.

The gauge drive resistor 61*a* is connected to a power supply 61*k* and a midpoint between the gauge resistors 20*a* and 20*d* so that the sensor chip 20 is driven at a constant voltage. The gauge drive resistor 61*a* is made of polysilicon, and when the circuit substrate 61 is self-heated, the resistance value changes according to the temperature.

Figure 13:
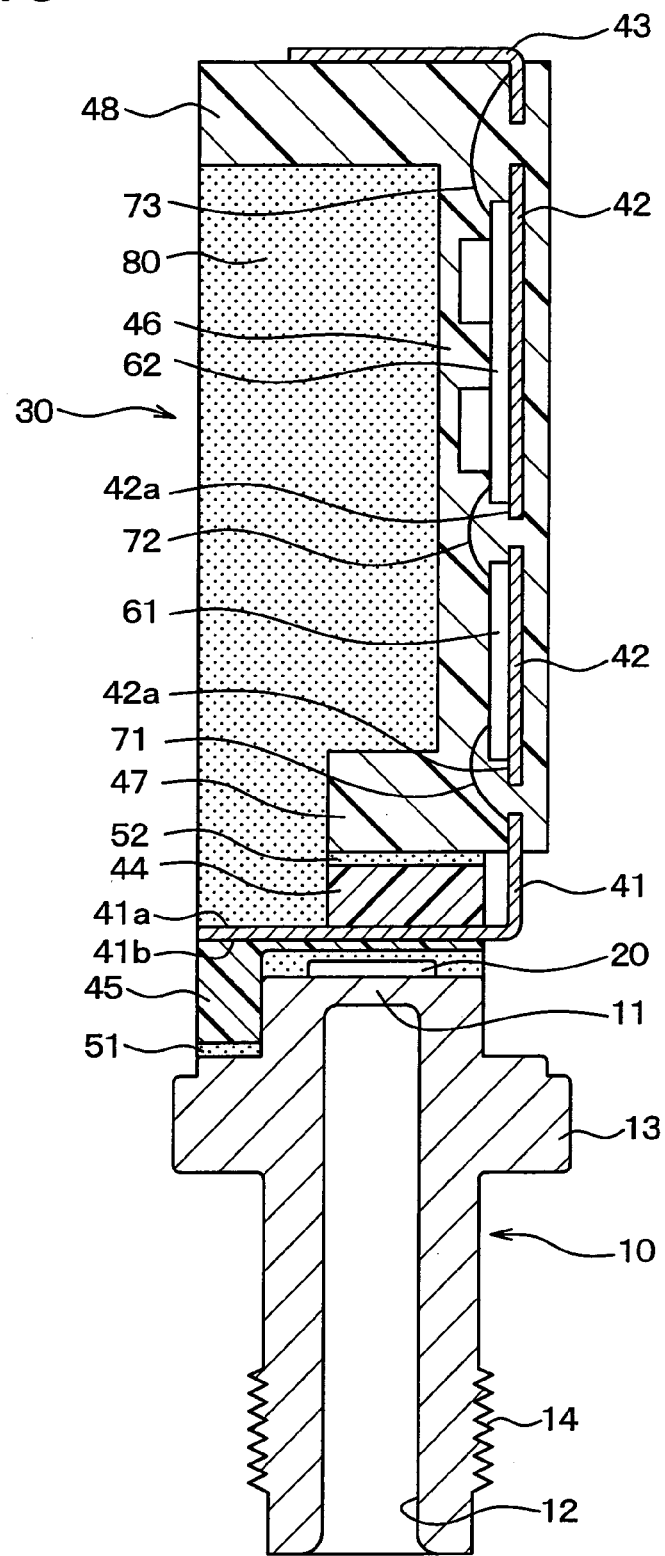
FIG. 13 is a cross-sectional view of a pressure sensor according to a seventh embodiment of the present disclosure.

As illustrated in FIG. 13, in this embodiment, the sensor chip 20 and the circuit substrate 61 are coated with a gel 80 such as silicone type high in thermal conductivity so that the sensor chip 20 and the circuit substrate 61 are thermally connected to each other.

In other words, in this embodiment, the sensor chip 20 and the circuit substrate 61 have substantially the same temperature. That is, the respective gauge resistors 20*a* to 20*d* and the gauge drive resistor 61*a* are subjected to substantially the same temperature change, and the respective gauge resistors 20*a* to 20*d* and the gauge drive resistor 61*a* are subjected to a resistance value change to substantially the same temperature. In this embodiment, the gel 80 corresponds to a heat conduction member of the present disclosure.

Figure 12:
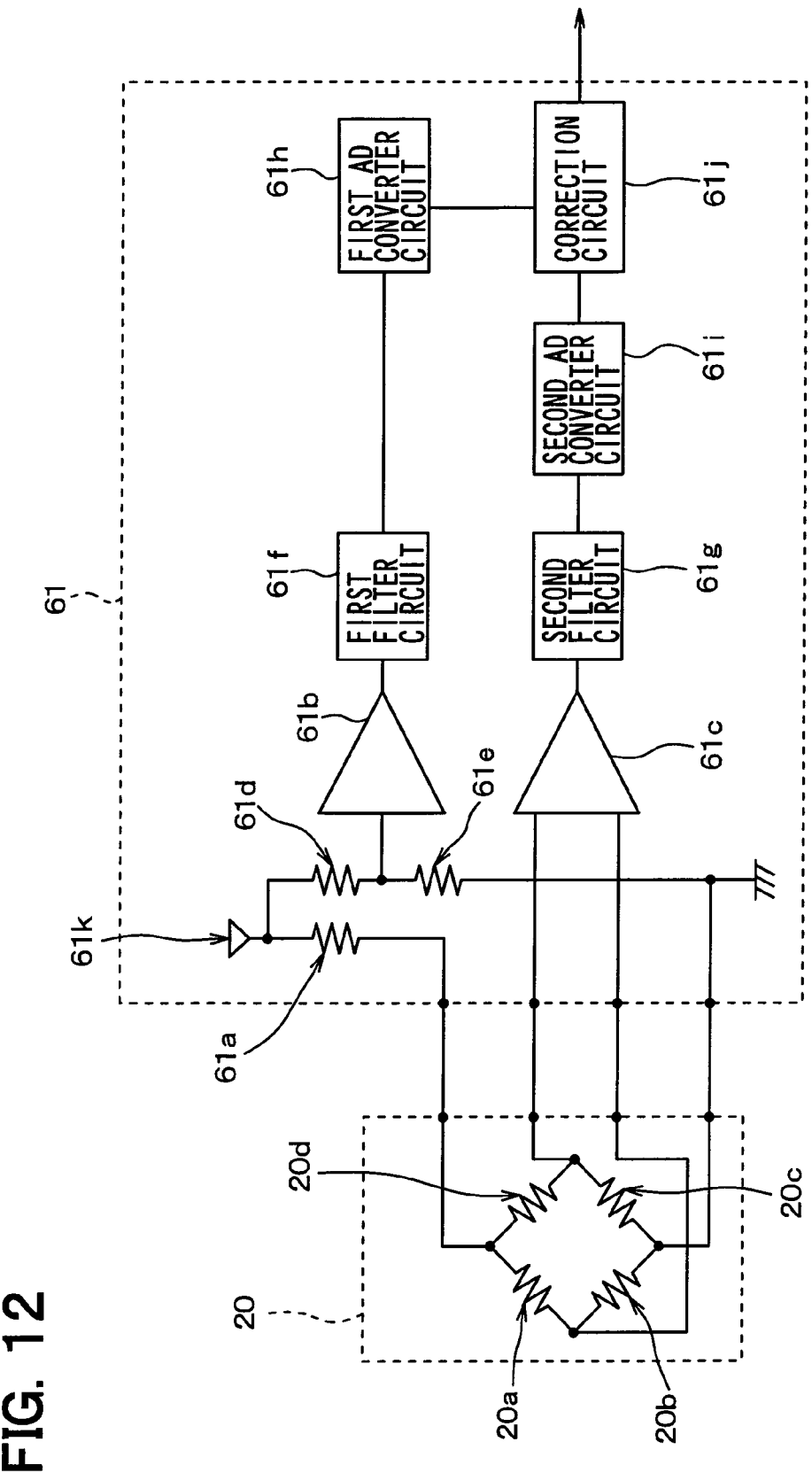
FIG. 12 is a diagram illustrating circuit configurations of a sensor chip and a circuit substrate according to a seventh embodiment of the present disclosure.

As illustrated in FIG. 12, the first amplifier 61*b* is connected to a midpoint between the first and second resistors 61*d* and 61*e* connected to the power supply 61*k*. A midpoint between the gauge resistors 20*b* and 20*c* is connected between a portion of the second resistor 61*e* opposite to the first resistor 61*d* and a ground. As a result, the first amplifier 61*b* receives a temperature detection signal corresponding to a temperature of the sensor chip 20 (gauge resistors 20*a* to 20*d*). The first amplifier 61*b* amplifies the temperature detection signal by a predetermined multiple, and outputs the amplified signal.

The first and second resistors 61*d*, 61*e* are made of polysilicon as with the gauge drive resistor 61*a*, and the resistance value changes due to the self-heating of the circuit substrate 61. However, because the first amplifier 61*b* is connected to the midpoint between the first and second resistors 61*d* and 61*e*, a change in the resistance value of the first and second resistors 61*d* and 61*e* is substantially canceled.

The second amplifier 61*c* is connected to a midpoint between the gauge resistors 20*a* and 20*b*, and a midpoint between the gauge resistors 20*c* and 20*d*. With that configuration, the second amplifier 61*c* receives a sensor signal corresponding to a pressure of the sensor chip 20 (gauge resistors 20*a* to 20*d*), and differentially amplifies the sensor signal by a predetermined multiple, and outputs the amplified signal.

The first filter circuit 61*f* is connected to the first amplifier 61*b*, and the second filter circuit 61*g* is connected to the second amplifier 61*c*. The first and second filter circuits 61*f* and 61*g* each have a low pass filter, and cut a component (noise) of a predetermined frequency or higher.

The first AD converter circuit 61*h* is connected to the first filter circuit 61*f*, and the second AD converter circuit 61*i* is connected to the second filter circuit 61*g*. The first and second AD converter circuits 61*h* and 61*i* convert analog signals output from the first and second filter circuits 61*f* and 61*g* into digital signals, respectively.

The correction circuit 61*j* performs a temperature characteristic correction of the sensor signal with the use of the digital signals (sensor signal and temperature detection signal) input from the first and second AD converter circuits 61*h* and 61*i*. As a result, a temperature offset can be removed from the sensor signal, and a detection precision can be restrained from being lowered.

As described above, in this embodiment, the sensor chip 20 is driven at the constant voltage. For that reason, a voltage for driving the circuit substrate 61 per se can be used as it is. In other words, as compared with a case in which the sensor chip 20 is driven with a constant current, a circuit for stabilizing the current can be made unnecessary.

The gauge drive resistor 61*a* for driving the sensor chip 20 at the constant voltage changes in the resistance value due to the self-heating of the circuit substrate 61. The sensor chip 20 and the circuit substrate 61 are thermally connected to each other through the gel 80. For that reason, a change in the resistance value to substantially the same temperature occurs in the respective gauge resistors 20*a* to 20*d* and the gauge drive resistor 61*a*. The temperature characteristic correction of the sensor signal is performed by the correction circuit 61*j* on the basis of the temperature detection signal. For that reason, an output variation caused by the self-heating of the circuit substrate 61 can be suppressed, and a reduction in the detection precision can be suppressed.

Further, the temperature detection signal output from the sensor chip 20 is used for the temperature characteristic correction with the gauge resistors 20*a* to 20*d* as the temperature sensitive resistances. For that reason, as compared with a case in which the temperature sensitive resistance is provided in the circuit substrate 61 in addition to the gauge drive resistor 61*a*, the circuit substrate 61 can be restrained from increasing in size.

In the above configuration, one or both of the first and second filter circuits 61*f* and 61*g* may not be provided. In that case, the first and second amplifiers 61*b* and 61*c* are connected to the first and second AD converter circuits 61*h* and 61*i* as they are, respectively. In the above description, the example in which the temperature characteristic correction is performed after the analog signal (sensor signal and temperature detection signal) is converted into the digital signal is described. Alternatively, the analog signal may be used as it is.

In FIG. 13, the ceramic substrate 62 on which a capacitor is mounted is also sealed with the gel 80. Alternatively, the ceramic substrate 62 may not be sealed with the gel 80. In other words, in this embodiment, the circuit substrate 61 corresponds to the circuit element of the present disclosure.

Eighth Embodiment

An eighth embodiment of the present disclosure will be described. In this embodiment, materials of the internal connection region 41, the mounting region 42, the external connection region 43, and the bonding wires 71, 75 are changed as compared with the first embodiment. The other configurations are identical with those in the seventh embodiment, and therefore their description will be omitted.

In this embodiment, a basic configuration is identical with that in the seventh embodiment. The internal connection region 41, the mounting region 42, and the external connection region 43 are made of a material high in the thermal conductivity such as silver, copper, or gold. In other words, the internal connection region 41, the mounting region 42, and the external connection region 43 are formed of a lead frame 40 made of a material high in the thermal conductivity such as silver, copper, or gold. The bonding wires 71 and 75 are made of a material high in the thermal conductivity such as silver, copper, or gold.

In other words, in this embodiment, the sensor chip 20 and the circuit substrate 61 are thermally connected to each other through the internal connection region 41 and the bonding wires 71, 75.

According to the above configuration, a temperature difference between the sensor chip 20 and the circuit substrate 61 can be further reduced, and the same advantages as those in the seventh embodiment can be obtained while a precision in the temperature characteristic correction is improved.

As described above, when the sensor chip 20 and the circuit substrate 61 are thermally connected to each other through the internal connection region 41 and the bonding wires 71, 75, the gel 80 may not be disposed.

Ninth Embodiment

A ninth embodiment of the present disclosure will be described. In this embodiment, a part of the internal connection region 41 is joined to the stem 10 as compared with the first embodiment. The other configurations are identical with those in the first embodiment, and therefore their description will be omitted.

Figure 14:
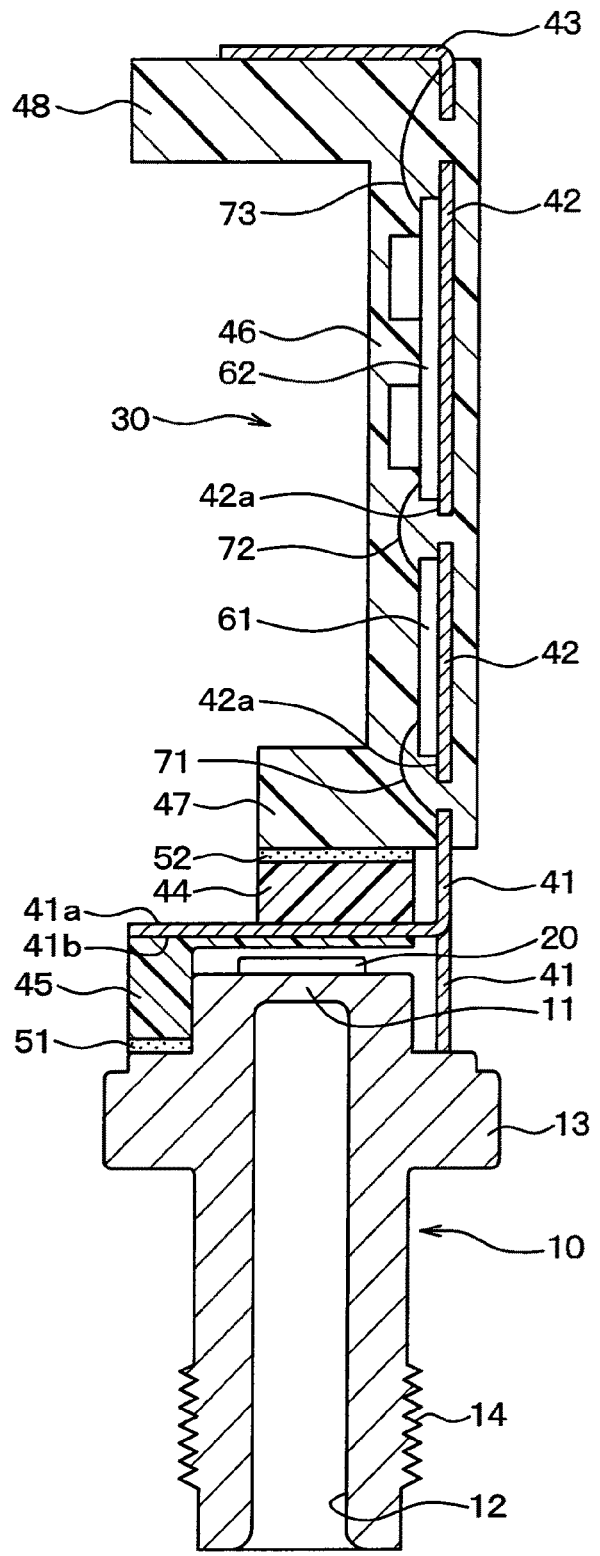
FIG. 14 is a cross-sectional view of a pressure sensor according to a ninth embodiment of the present disclosure.

In this embodiment, the internal connection region 41 is formed of five plate members, and as illustrated in FIG. 14, the other end of one of the plate members configuring the internal connection region 41 is electrically connected to the stem 10. Specifically, one of the plate members configuring the internal connection region 41 is not connected to a sensor chip 20, and connected to the body ground. The four other plate members are connected to the sensor chip 20 as in the above first embodiment.

According to the above configuration, an exogenous noise can be emitted from the stem 10, and the same advantages as those in the first embodiment can be obtained while a noise immunity (EMC characteristic) is improved.

Tenth Embodiment

A tenth embodiment of the present disclosure will be described. In this embodiment, a metal cover is provided as compared with the first embodiment. The other configurations are identical with those in the first embodiment, and therefore their description will be omitted.

Figure 15:
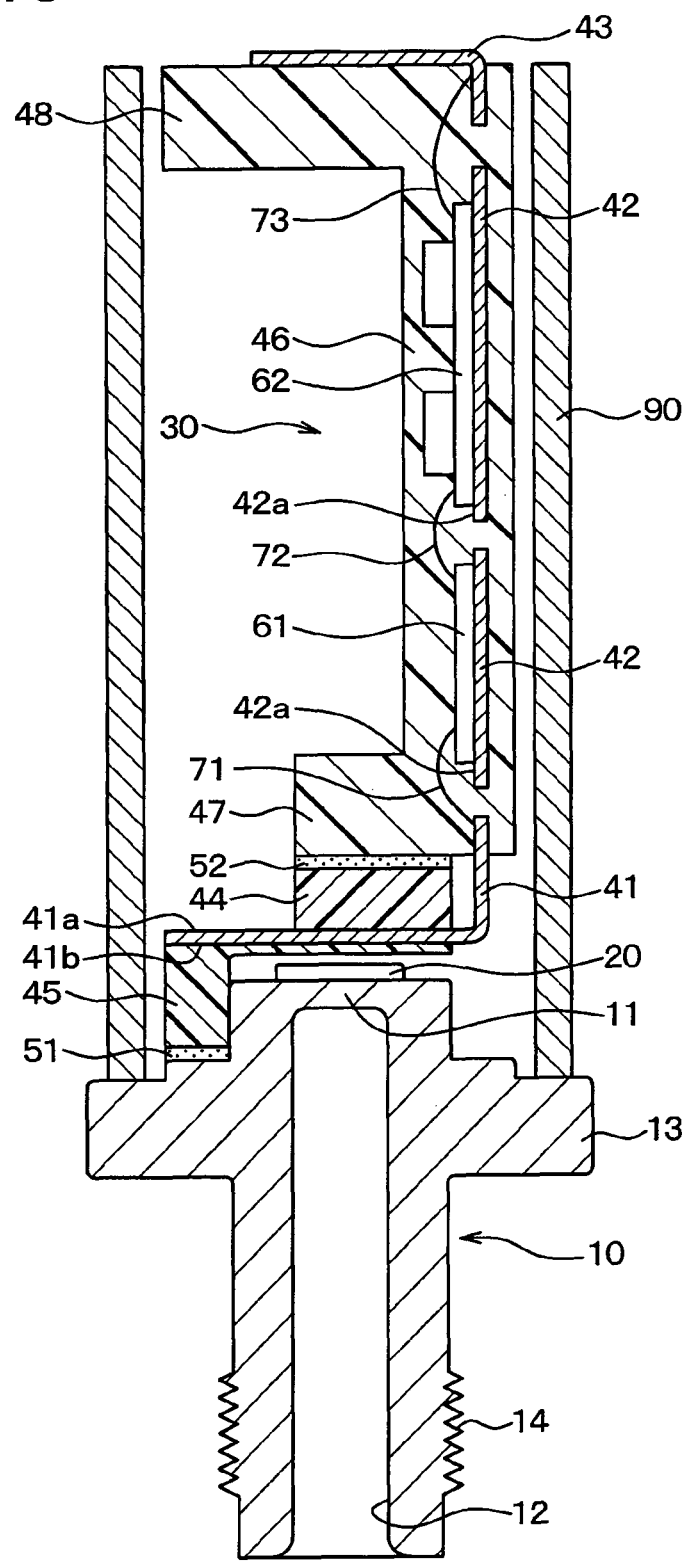
FIG. 15 is a cross-sectional view of a pressure sensor according to a tenth embodiment of the present disclosure.

In this embodiment, as illustrated in FIG. 15, a cylindrical metal cover 90 having a hollow portion with openings on both ends is provided on the stem 10. Specifically, the metal cover 90 is made of stainless steel such as SUS 430, and provided on the stem 10 in a state where one end of the metal cover 90 is joined to a step portion 13 of the stem 10 by welding so that a sensor chip 20 and a component 30 are accommodated in the hollow portion.

According to the above configuration, the same advantages as those in the first embodiment can be obtained while the sensor chip 20 and the component 30 are protected. Because the pressure sensor can be conveyed by holding the metal cover 90, the conveyance can be simplified.

In this embodiment, the example in which the metal cover 90 is joined to the stem 10 by welding is described. However, the joint of the metal cover 90 and the stem 10 is not limited to the above configuration. For example, a pair of concave and convex portions may be defined in the metal cover 90 and the stem 10, and those portions may be fitted to each other to fix the metal cover 90 to the stem 10. An electrically conductive adhesive may be disposed between the metal cover 90 and the stem 10, and the metal cover 90 may be joined to the stem 10 through the electrically conductive adhesive.

Eleventh Embodiment

An eleventh embodiment of the present disclosure will be described. In this embodiment, a part of an external connection region is joined to a metal cover 90 as compared with the tenth embodiment. The other configurations are identical with those in the tenth embodiment, and therefore their description will be omitted.

Figure 16:
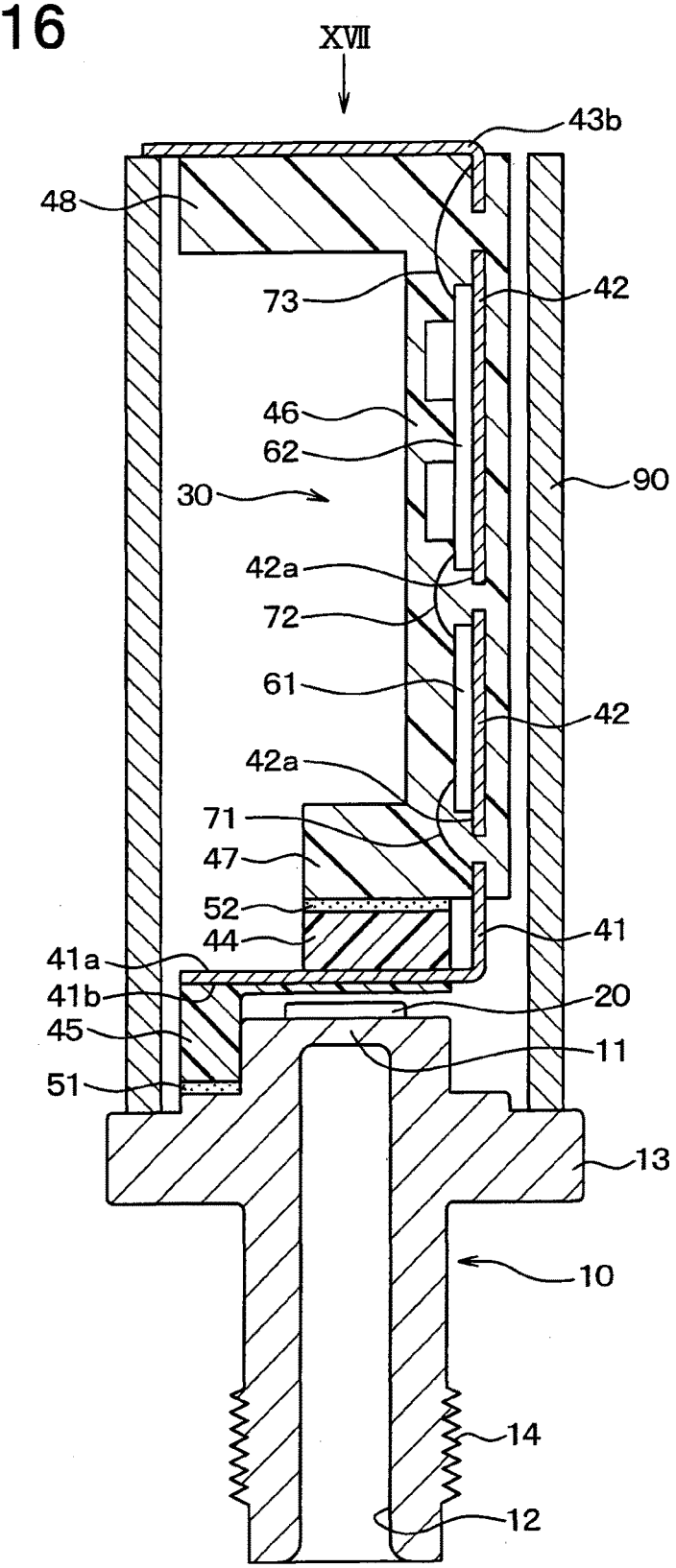
FIG. 16 is a cross-sectional view of a pressure sensor according to an eleventh embodiment of the present disclosure.
Figure 17:
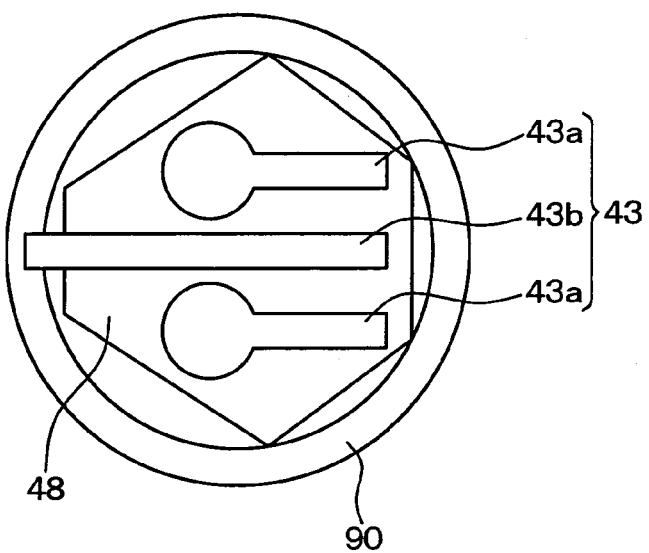
FIG. 17 is a view taken in an arrow XVII in FIG. 16.

In this embodiment, as illustrated in FIGS. 16 and 17, an external connection region 43 includes two plate members 43a for performing an electric connection with an external circuit, and a plate member 43b disposed between those plate members 43a. As with the plate members 43a, the plate member 43b has one end connected with a ceramic substrate 62 through bonding wires 73, and is sealed with a sealing portion 46. The plate member 43b has the other end joined to the metal cover 90 by welding. In other words, the plate member 43b is electrically connected to the stem 10 through the metal cover 90 so as to be connected to the body ground.

According to the above configuration, the same advantages as those in the tenth embodiment can be obtained while a noise immunity (EMC characteristic) is improved as with the ninth embodiment. The other end of the plate member 43b in the external connection region 43 is joined to the metal cover 90. In other words, an end side of the component 30 opposite to the stem 10 is fixed to the metal cover 90. For that reason, the end of the component 30 opposite to the stem 10 can be restrained from wavering, and positioning in connecting the external circuit to the external connection region 43 (plate members 43a) can be facilitated.

In this embodiment, the sealing portion 46, and the first and second protruding portions 47, 48 over the mounting portion 44 are mechanically fixed by joining the plate member 43b in the external connection region 43 to the metal cover 90 by welding. For that reason, no adhesive 52 may be disposed between an outer side surface of the first protruding portion 47 and the mounting portion 44. According to that configuration, the adhesive 52 disposed between the outer side surface of the first protruding portion 47 and the mounting portion 44 can be reduced.

In this embodiment, the example in which the plate member 43b is disposed between the plate members 43a is described. The arrangement of the plate members 43a and 43b can be appropriately changed.

Twelfth Embodiment

A twelfth embodiment of the present disclosure will be described. In this embodiment, a shape of a component 30 is changed as compared with the first embodiment. The other configurations are identical with those in the first embodiment, and therefore their description will be omitted.

Figure 18:
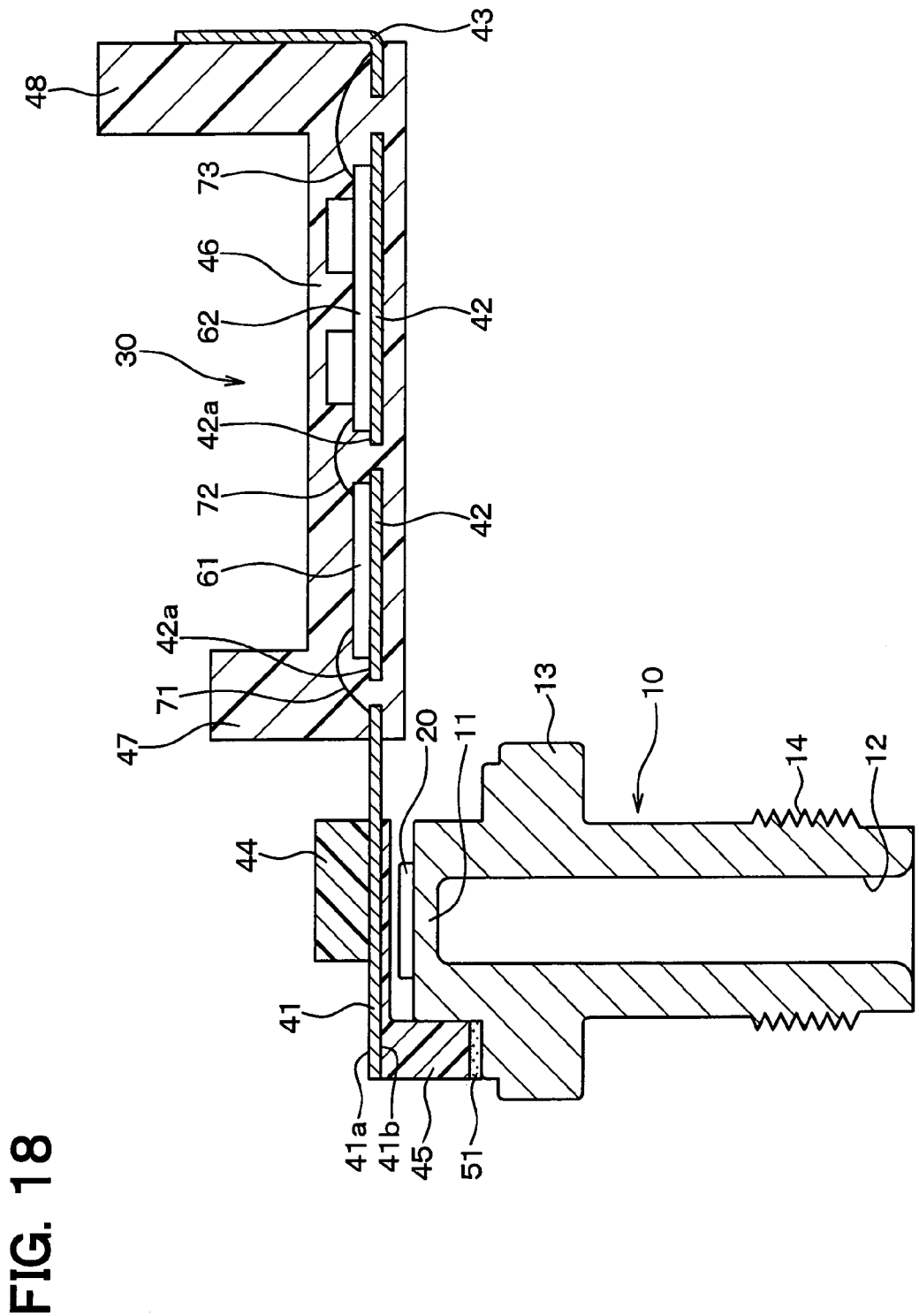
FIG. 18 is a cross-sectional view of a pressure sensor according to a twelfth embodiment of the present disclosure.

As illustrated in FIG. 18, in this embodiment, a component 30 is disposed along a planar direction of a diaphragm 11. In other words, the other end of an internal connection region 41 is not bent.

As described above, the present disclosure can be applied to a pressure sensor in which the component 30 is disposed along the planar direction of the diaphragm 11. It is preferable that the pressure sensor is used when a length is restricted in the normal direction of the diaphragm 11. The pressure sensor according to this embodiment is manufactured by not bending the internal connection region 41 in the process of FIG. 3C.

Other Embodiments

For example, in the above respective embodiments, the lead frame 40 is described as the conductive member having the internal connection region 41, the mounting region 42, and the external connection region 43. Alternatively, for example, a conductive film or a flexible substrate may be used as the conductive member.

In the above first to sixth and eighth to twelfth embodiments, the mounting region 42, the circuit substrate 61, and the ceramic substrate 62 may not be provided.

Further, in the first to fifth and seventh to twelfth embodiments, the other end side of the external connection region 43 may not be bent so that the other end side of the external connection region 43 comes in contact with the side surface of the second protruding portion 48. For example, a portion of the external connection region 43, which is exposed from the sealing portion 46, may be formed into a spring shape, and electrically connected to the external circuit by coming into spring contact with the external circuit.

Figure 19:
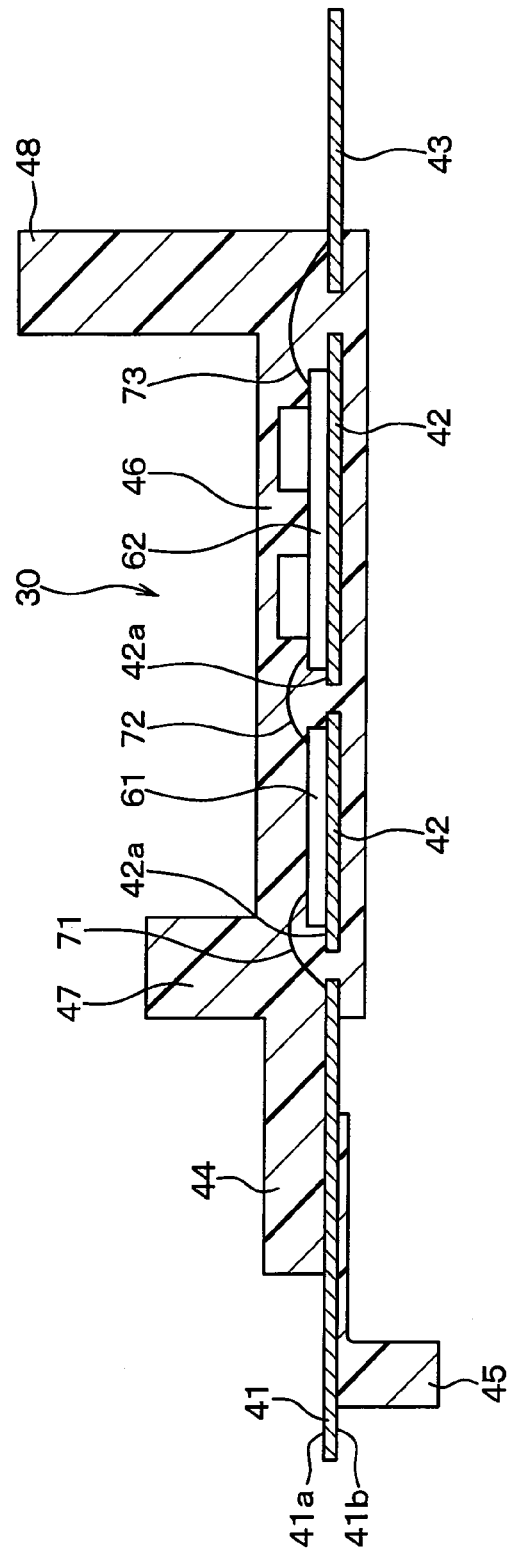
FIG. 19 is a cross-sectional view corresponding to the process of FIG. 2C according to another embodiment of the present disclosure.

In the second embodiment, in forming a resin mold so that the mounting portion 44 and the joint portion 45, and the sealing portion 46 and the first and second protruding portions 47, 48 are integrated together, a part of the portion of the internal connection region 41 to be bent may be exposed in advance. For example, as illustrated in FIG. 19, the resin mold may be so formed as to expose the other surface 41b of the portion of the internal connection region 41 to be bent. According to the above configuration, in performing the processes of FIGS. 6A and 7B, the resin molds of the portions that couple the mounting portion 44 with the joint portion 45, and the sealing portion 46 with the first and second protruding portions 47 and 48 can be removed by merely applying laser from one surface 41a side of the internal connection region 41, and the manufacturing process can be simplified.

Further, the above respective embodiments can be combined together. For example, with the combination of the second embodiment with the third to twelfth embodiments, the resin mold may be formed so that the mounting portion 44 and the joint portion 45, and the sealing portion 46 and the first and second protruding portions 47, 48 are integrated together. When the second embodiment is combined with the twelfth embodiment, because the other end of the internal connection region 41 is not bent, the processes of FIGS. 6B and 7B may not be performed. With the combination of the third embodiment with the fourth to twelfth embodiments, the lead frame 40 may be joined directly to the stem 10. With the combination of the fourth embodiment with the fifth to eleventh embodiments, the mounting portion 44 may be provided with the concave portion 44a, and the first protruding portion 47 may be provided with the convex portion 47a. Further, with the combination of the fifth embodiment with the sixth to eleventh embodiments, the rigidity of the portion to be bent may be lowered. With the combination of the sixth embodiment with the seventh to eleventh embodiments, the joint portion 48a may be formed in the external connection region 43. With the combination of the seventh and eighth embodiments with the ninth to twelfth embodiments, the sensor chip 20 may be thermally connected to the circuit substrate 61. Further, with the combination of the ninth embodiment with the tenth to twelfth embodiments, a part of the internal connection region 41 may be joined to the stem 10. When the ninth embodiment is combined with the eleventh embodiment, a part of the internal connection region 41 and a part of the external connection region 43 are connected to the body ground. Further, the respective combinations of the above respective embodiments may be further combined together.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A method for manufacturing a pressure sensor comprising:
preparing a stem which has a cylindrical shape with a bottom having a hollow portion with an opening on one end of the stem, the bottom as a diaphragm being deformable by a pressure introduced into the hollow portion;
mounting a sensor chip, which outputs a sensor signal according to a deformation of the diaphragm, on a side of the diaphragm opposite to the hollow portion;
preparing a conductive member, in which an internal connection region connected to the sensor chip through a first connection member is integrated with an external connection region electrically connected to an external circuit by an outer frame;
forming a first resin mold by molding with mold resin to couple the internal connection region to the external connection region;
separating the outer frame from the internal connection region and the external connection region;
arranging the internal connection region of the conductive member in the stem; and
electrically connecting the sensor chip and the internal connection region through the first connection member,
the conductive member further includes a mounting region between the internal connection region and the external connection region,
the method for manufacturing the pressure sensor further comprising:
mounting a circuit element for performing a predetermined process on the mounting region before the arranging of the internal connection region;
electrically connecting the circuit element and the internal connection region through a second connection member; and
electrically connecting the circuit element and the external connection region through a third connection member, wherein:
in the forming of the first resin mold, the first resin mold seals the mounting region, the circuit element, the second connection member, and the third connection member.

2. The method for manufacturing the pressure sensor according to claim 1, wherein:
the forming of the first resin mold is performed after the mounting of the circuit element and before the arranging of the internal connection region;
in the forming of the first resin mold, a second resin mold is formed in the internal connection region to expose a part of the internal connection region together with the first resin mold, in the arranging of the internal connection region, the second resin mold is bonded to the stem to arrange the internal connection region in the stem, the electrically connecting of the circuit element and the internal connection region and the electrically connecting the circuit element and the external connection region are performed after the arranging of the internal connection region; and in the electrically connecting of the circuit element and the internal connection region, the sensor chip is electrically connected to a portion of the internal connection region which is exposed from the second resin mold.

3. The method for manufacturing the pressure sensor according to claim 1, wherein:

in the arranging of the internal connection region, the internal connection region is bonded directly to the stem;

the forming of the first resin mold is performed after the electrically connecting of the circuit element and the internal connection region, and the electrically connecting of the circuit element and the external connection region; and in the forming of the first resin mold, a second resin mold is formed to cover the first resin mold and the first connection member, which connects the sensor chip and the internal connection region, over the internal connection region and the stem.

4. The method for manufacturing the pressure sensor according to claim 2, further comprising:

after the electrically connecting of the circuit element and the internal connection region and the electrically connecting of the circuit element and the external connection region, bending a portion of the internal connection region located between the first resin mold and the second resin mold, stacking the second resin mold on the first resin mold, and bonding the first resin mold and the second resin mold.

5. The method for manufacturing the pressure sensor according to claim 4, wherein:

in the forming of the first resin mold, the first resin mold and the second resin mold are integrated to each other, the method further comprising:

after the forming of the first resin mold and before the bending of the portion of the internal connection region, exposing a bending portion of the internal connection region from the resin mold; and partitioning the internal connection region into the first resin mold and the second resin mold by removing a portion of the resin mold that covers the bending portion of the internal connection region.

6. The method for manufacturing the pressure sensor according to claim 4, wherein:

in the forming of the first resin mold, a pair of fitting devices is formed in the first resin mold and the second resin mold, respectively; and in the bonding of the first resin mold and the second resin mold, the first resin mold and the second resin mold are bonded to each other while engaging the pair of fitting devices formed in the first resin mold and the second resin mold, respectively.

7. The method for manufacturing the pressure sensor according to claim 4, wherein:

a portion of the internal connection region located between the first resin mold and the second resin mold as the conductive member has a rigidity lower than a portion of the internal connection region sealed by the first resin mold and the second resin mold.

8. A pressure sensor comprising:

a stem that has a cylindrical shape with a bottom having a hollow portion with an opening on one end of the stem, the bottom as a diaphragm being deformable by a pressure introduced into the hollow portion;

a sensor chip that is mounted on a side of the diaphragm opposite to the hollow portion, and outputs a sensor signal according to a deformation of the diaphragm;

an internal connection region connected to the sensor chip through a first connection member and providing a part of a conductive member;

an external connection region electrically connected to an external circuit and providing another part of the conductive member;

a first resin mold that couples the internal connection region and the external connection region; and a second resin mold arranged in the internal connection region and bonded to the stem.

9. The pressure sensor according to claim 8, further comprising:

a mounting region that is disposed between the internal connection region and the external connection region, and providing a part of the conductive member, wherein a circuit element for performing a predetermined process is mounted on the mounting region, wherein:

the circuit element is electrically connected to the internal connection region through a second connection member;

the circuit element is electrically connected to the external connection region through a third connection member; and the first resin mold couples the internal connection region and the mounting region, and seals the mounting region, the circuit element, the second connection member, and the third connection member.

10. The pressure sensor according to claim 9, wherein:

the sensor chip outputs the sensor signal, and outputs a temperature detection signal corresponding to a temperature;

the sensor chip and the circuit element are thermally connected to each other through a heat transfer member; and the circuit element includes: a gauge drive resistor for driving the sensor chip at a constant voltage; and a correction circuit that performs a temperature characteristic correction of the sensor signal based on the temperature detection signal.

11. The pressure sensor according to claim 10, wherein:

the sensor chip and the circuit element are covered with gel as the heat transfer member.

12. The pressure sensor according to claim 10, wherein:

the heat transfer member includes the internal connection region, the first connection member, and the second connection member.

13. The pressure sensor according to claim 8, wherein:

the internal connection region has a plurality of plate members; and one of the plurality of plate members is electrically coupled to the stem to provide a body ground.

14. The pressure sensor according to claim 8, wherein:

the first resin mold is stacked on the second resin mold.

15. The pressure sensor according to claim 14, wherein:

the first resin mold and the second resin mold have fitting devices respectively; and the fitting devices are engaged with each other.

16. The pressure sensor according to claim 14, further comprising:
 a cylindrical metal cover having a hollow portion with openings on both ends, wherein:
 the metal cover is disposed in the stem in a state where the sensor chip, the first resin mold and second resin mold are accommodated in the hollow portion of the metal cover.

17. The pressure sensor according to claim 16, wherein:
 the external connection region has a plurality of plate members; and
 one of the plurality of plate members is bonded to the metal cover, and electrically connected to the stem through the metal cover to provide a body ground.

* * * * *